(12) United States Patent
Shirai

(10) Patent No.: US 7,773,272 B2
(45) Date of Patent: Aug. 10, 2010

(54) IMAGE READING APPARATUS

(75) Inventor: Takaaki Shirai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 985 days.

(21) Appl. No.: 11/529,258

(22) Filed: Sep. 29, 2006

(65) Prior Publication Data

US 2007/0076271 A1 Apr. 5, 2007

(30) Foreign Application Priority Data

Sep. 29, 2005 (JP) .......................... P2005-283665

(51) Int. Cl.
  *G03G 15/00* (2006.01)
  *B65H 5/00* (2006.01)
  *H04N 1/04* (2006.01)
(52) U.S. Cl. .................. 358/474; 271/264; 399/364
(58) Field of Classification Search ................ 271/184, 271/185, 186, 291, 264, 391; 399/401, 405, 399/364, 374, 373; 358/449, 474, 401, 496, 358/497, 498
See application file for complete search history.

(56) References Cited

U.S. PATENT DOCUMENTS

| | | | | | |
|---|---|---|---|---|---|
| 5,438,435 | A | * | 8/1995 | Lawniczak ................. | 358/496 |
| 5,784,680 | A | * | 7/1998 | Taruki ....................... | 399/374 |
| 5,991,592 | A | * | 11/1999 | Kobayashi et al. ......... | 399/374 |
| 6,009,303 | A | | 12/1999 | Kumagai et al. | |
| 6,038,424 | A | * | 3/2000 | Nakagawa ................. | 399/367 |
| 6,088,135 | A | | 7/2000 | Kusumoto | |
| 6,098,977 | A | * | 8/2000 | Sato et al. .................. | 271/186 |
| 6,161,831 | A | | 12/2000 | Kusakabe et al. | |
| 6,438,350 | B1 | | 8/2002 | Hasegawa et al. | |
| 7,344,326 | B2 | * | 3/2008 | Yasui et al. ................ | 400/603 |
| 7,356,303 | B2 | * | 4/2008 | Mizuno et al. ............. | 399/406 |
| 7,410,163 | B2 | * | 8/2008 | Yamanaka ................. | 271/186 |
| 7,611,145 | B2 | * | 11/2009 | Iwago et al. ............... | 271/291 |
| 7,619,785 | B2 | * | 11/2009 | Sodeura et al. ............ | 358/474 |

FOREIGN PATENT DOCUMENTS

| | | |
|---|---|---|
| JP | 5-199341 | 8/1993 |
| JP | H05-328078 A | 12/1993 |

(Continued)

OTHER PUBLICATIONS

Japan Patent Office; Notification of Reasons for Refusal in Japanese Patent Application No. 2005-283665 (counterpart to the above-captioned U.S. patent application) mailed Apr. 13, 2010.

*Primary Examiner*—Jerome Grant, II
(74) *Attorney, Agent, or Firm*—Baker Botts L.L.P.

(57) ABSTRACT

An image reading apparatus that includes: a document delivering unit; a switchback delivering unit that pulls a document into a switchback delivery path extended to an opening formed on an external surface of an apparatus housing from a predetermined position of the document delivery path; an image reading unit that reads an image of the document delivered to a reading position of the document delivery path; and a control unit that delivers a document inserted into the opening of the switchback delivery path to the reading position by the switchback delivering unit and the document delivering unit, thereby reading an image in a second image reading operation to be carried out by temporarily stopping a first image reading operation.

7 Claims, 18 Drawing Sheets

FOREIGN PATENT DOCUMENTS

| | | |
|---|---|---|
| JP | 7-64359 | 3/1995 |
| JP | H10-254192 A | 9/1998 |
| JP | H11-125995 A | 5/1999 |
| JP | H11-167229 A | 6/1999 |
| JP | H11-263540 A | 9/1999 |
| JP | 2000-332953 A | 11/2000 |
| JP | 2001-119522 A | 4/2001 |

* cited by examiner

IMAGE READING APPARATUS

CROSS REFERENCE TO RELATED APPLICATION

This application claims priority from Japanese Patent Application No. 2005-283665, filed on Sep. 29, 2005, the entire subject matter of which is incorporated herein by reference.

TECHNICAL FIELD

Aspects of the present invention relate to an image reading apparatus comprising a document delivering unit for delivering a document over which an image reading operation is to be carried out along a document delivery path linked to a document discharging portion via a reading position from a document mounting portion, a switchback delivering unit for pulling the document into a switchback delivery path from a predetermined position of the document delivery path, thereby returning the document from a downstream side of the reading position to an upstream side of the reading position with a leading and a trailing end in the document inverted, and an image reading unit for reading an image of the document delivered in the reading position of the document delivery path.

BACKGROUND

Conventionally, there has been known an image reading apparatus which is mounted on a copying apparatus, a scanner apparatus or a multi function apparatus having a copy function and a scanner function and comprises an automatic document delivering device referred to as an ADF (Auto Document Feeder) for delivering a document from a sheet feed tray to a sheet discharge tray through a delivery path. Moreover, there has been known an image reading apparatus for switching back a document having both sides, that is, first and second faces which are printed, in the middle of a delivery to invert a leading and a trailing end in the document, thereby reading both sides of the document in order to read the document (see JP-A-7-64359)

On the other hand, there has been known an image reading apparatus capable of reading an image of another document during an image reading operation which is being carried out as in an interruption copy in a copying apparatus. In such an image reading apparatus, reading conditions for the image reading operation carried out partway and image data are stored in a predetermined region of a memory in the interruption copy, and the interrupted image reading operation is restarted by using the reading conditions and the image data which are stored in the memory after the interruption copy is ended so that the interruption copy is implemented without wasting the image reading operation carried out partway (see JP-A-5-199341).

In the case in which a first image reading operation is interrupted and a second image reading operation is then carried out in the image reading apparatus as in the interruption copy, it is necessary to replace a document subjected to the first image reading operation partway with a document over which the second image reading operation is to be carried out. In other words, the first image reading operation is interrupted and a current document is then removed from a sheet feed tray and a sheet discharge tray of the image reading apparatus, and another document over which the second image reading operation is to be carried out is set onto the sheet feed tray. When the second image reading operation is ended, thereafter, the read document is removed from the sheet discharge tray and the document subjected to the first image reading operation partway is set onto the sheet feed tray again. Subsequently, the first image reading operation is restarted.

The interruption copy is used for an urgent copy, and furthermore, is also used for preventing another person from waiting for a copy of one document for a long time in the case in which a copying apparatus is occupied for a long period of time in order to read images of a large number of documents, for example. However, a work for removing a large number of documents from the sheet feed tray and the sheet discharge tray to execute the interruption copy and setting the documents again after the end of the interruption copy is also complicated.

SUMMARY

Aspects of the invention provide an image reading apparatus being capable of carrying out a second image reading operation over a document subjected to a first image reading operation partway without removing the document from a document mounting portion and a document discharging portion and capable of reading both sides of the document.

DETAILED DESCRIPTION

[General Overview]

Figure 1:
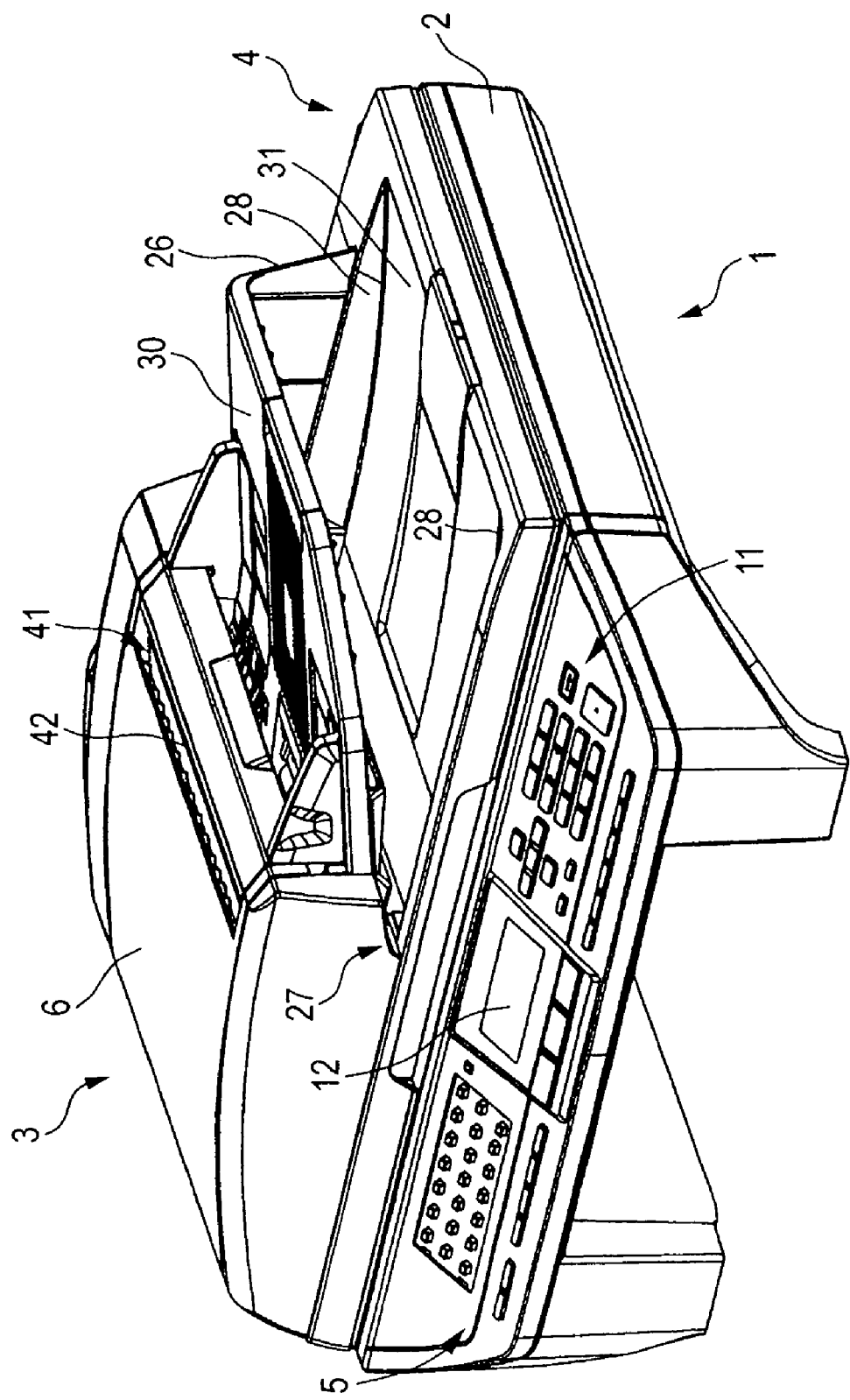
FIG. 1 is a perspective view showing a structure of an outer appearance of an image reading apparatus according to an aspect of the invention.

According to an aspect of the invention, there is provided an image reading apparatus comprising: a document delivering unit that delivers a document over which an image reading operation is to be carried out along a document delivery path linked to a document discharging portion via a reading position from a document mounting portion; a switchback delivering unit that pulls the document into a switchback delivery path extended to an opening formed on an external surface of an apparatus housing from a predetermined position of the document delivery path, thereby returning the document from a downstream side of the image reading position to an upstream side of the image reading position with a leading and a trailing end in the document inverted; an image reading unit that reads an image of the document delivered to the reading position of the document delivery path; and a control unit that delivers a document inserted into the opening of the switchback delivery path to the reading position by the switchback delivering unit and the document delivering unit, thereby reading an image in a second image reading operation to be carried out by temporarily stopping a first image reading operation.

The document over which the first image reading operation is to be carried out is mounted on the document mounting portion. When the first image reading operation is started, the documents in the document mounting portion are fed one by one to the sheet delivery path. In case of a single side reading operation, the document fed to the document delivery path passes through the reading position and is discharged to the document discharging portion. When the document passes through the reading position, the image reading unit reads an image on a first face (a surface) of the document. In case of a double side reading operation, the document passing through the reading position is guided to the switchback delivery path. The document entering the switchback delivery path from the downstream side of the reading position is returned to the upstream side of the reading position of the document delivery path with the leading and the trailing end inverted. The document returned to the document delivery path is delivered with a second face (back face) opposed to the reading position. When the document passes through the reading position, the image reading unit reads an image of the second face. The document subjected to the single side reading operation or the double side reading operation is discharged to the document discharging portion.

When an interruption for the second image reading operation is input during the execution of the first image reading operation, the first image reading operation is stopped temporarily. Accordingly, a part of the document over which the first image reading operation is to be carried out remains in the document mounting portion. The second image reading operation indicates another image reading operation to be carried out by temporarily stopping the first image reading operation. The document over which the second image reading operation is to be carried out is inserted in the opening of the switchback delivery path. When the start of the second image reading operation is input, the control unit drives the switchback delivering unit and the document delivering unit to deliver the document from the switchback delivery path to the document delivery path and to cause the same document to pass through the reading position. The image reading unit reads the image of the document when the document passes through the reading position. The second image reading operation may be a single side reading operation or a double side reading operation.

When the second image reading operation is ended and the restart of the first image reading operation is input, the first image reading operation stopped temporarily is restarted. The documents remaining in the document mounting portion are fed one by one to the document delivery path and the single side reading operation or the double side reading operation is carried out so that the documents are discharged to the document discharging portion in the same manner as described above.

According to another aspect of the invention, the image reading apparatus may comprise a stoppage request unit that gives a request for stopping the first image reading operation; a second image reading start request unit that gives a request for starting the second image reading operation during the stoppage of the first image reading operation; and a first image reading restart request unit that gives a request for restarting the first image reading operation which is stopped, the control unit storing, in a storage unit, image data obtained by reading an image and a reading condition for the first image reading operation when the request for stopping the first image reading operation is given by the stoppage request unit, delivering the document inserted in the opening of the switchback delivery path to the document delivery path, thereby reading an image when the request for starting the second image reading operation is given by the second image reading start request unit, and restarting the first image reading operation based on the image data and the reading condition which are stored in the storage unit when the request for restarting the first image reading operation is given by the restart request unit.

In the case in which the interruption for the second image reading operation is carried out during the execution of the first image reading operation, a stoppage of the first image reading operation is input to the stop request unit and the control unit temporarily stops the first image reading operation, and furthermore, causes the storage unit to store the image data and the reading conditions. When the start of the second image reading operation is input to the second image reading start request unit, the control unit delivers the document inserted in the opening of the switchback delivery path to the document delivery path to cause the image reading unit to read an image. When the second image reading operation is ended and the restart of the first image reading operation is input to the first image reading restarting unit, the control unit restarts the first image reading operation based on the image data and the reading conditions which are stored in the storage unit. When restarting the first image reading operation, consequently, it is possible to omit the image reading operation for the document subjected to the image reading operation. Therefore, it is possible to shorten a time required for the first image reading operation after the restart. Moreover, the reading conditions set to carry out the first image reading operation are stored and used in the restart. Therefore, it is not necessary to input the reading conditions again when restarting the first image reading operation.

According to still another aspect of the invention, the control unit may serve to discharge the document subjected to the second image reading operation to the opening of the switchback delivery path.

Consequently, the document subjected to the second image reading operation is not mixed with the documents subjected to the first image reading operation and discharged to the document discharging portion. In particular, the invention is suitable for the case in which the second image reading operation is to be carried out over one document.

According to still another aspect of the invention, the control unit may serve to discharge the document subjected to the second image reading operation to the document discharging portion.

Consequently, the documents subjected to the second image reading operation are sequentially discharged to the document discharging portion. In particular, the invention is suitable for the case in which the second image reading operation is to be carried out over a plurality of documents.

According to still another aspect of the invention, the control unit may serve to discharge the document discharged to the opening of the switchback delivery path to the document discharging portion after a predetermined time passes.

If the document subjected to the second image reading operation remains in the opening of the switchback delivery path, the document might cause a sheet jam when the first image reading operation is restarted to carry out a double side reading operation. When the document is discharged to the document discharging portion after the predetermined time passes, the first image reading operation can be restarted even if a user carrying out the second image reading operation does not remove the read document.

According to still another aspect of the invention, the control unit may serve to restart the first image reading operation stopped temporarily after the predetermined time passes since execution of the second image reading operation.

Even if the user carrying out the second image reading operation does not input the restart for the first image reading operation, consequently, the first image reading operation is restarted after the predetermined time passes. Therefore, it is possible to prevent the document from being left in the middle of the first image reading operation.

According to still another aspect of the invention, the document mounting portion and the document discharging portion may be disposed in two stages, that is, upper and lower stages and the switchback delivery path may be extended toward an upper side of the document mounting portion and the document discharging portion.

The switchback delivery path is extended toward the upper side of the document mounting portion and the document discharging portion. Consequently, the opening of the switchback delivery path is placed on the upper side of the document mounting portion and the document discharging portion. Consequently, it is possible to easily insert the document into the opening in the second image reading operation.

According to the image reading apparatus, thus, the document for the second image reading operation to be carried out by temporarily stopping the first image reading operation is inserted into the opening of the switchback delivery path. In the execution of the second image reading operation, therefore, it is not necessary to remove a part of the documents remaining in the document mounting portion over which the first image reading operation is to be carried out. Thus, a procedure for the second image reading operation and the restart of the first image reading operation can be simplified so that a utility can be enhanced.

An aspect of the invention will be described below with reference to the drawings. It is apparent that the aspect is a simple example of the invention and can be properly changed without departing from the scope of the invention.

Figure 2:
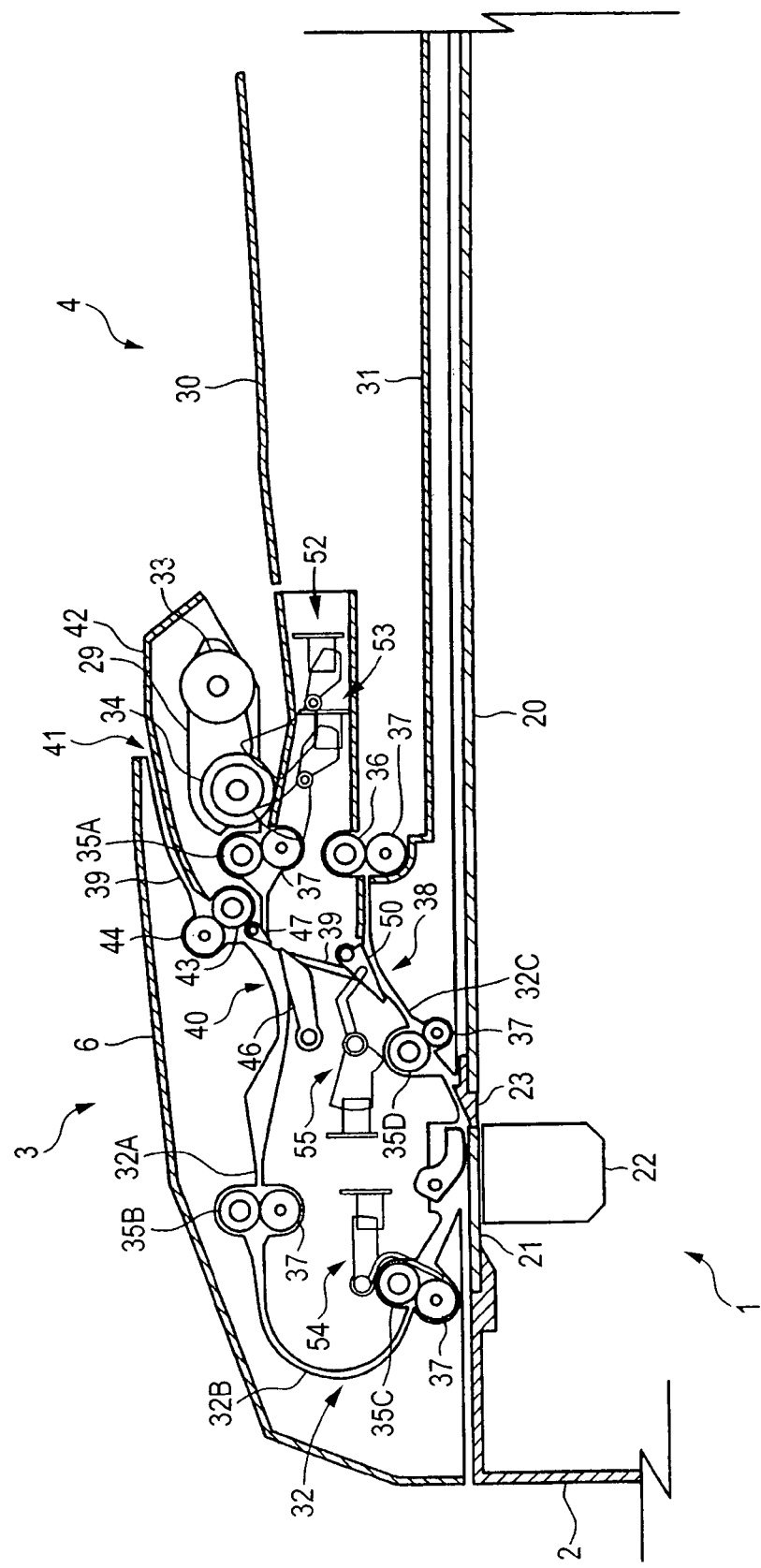
FIG. 2 is a longitudinal sectional view showing an internal structure of the image reading apparatus.

FIGS. 1 and 2 show a main structure of an image reading apparatus 1 according to the aspect of the invention. The image reading apparatus 1 is implemented as an image reading portion for reading an image of a document in a copying apparatus, a facsimile apparatus, a scanner apparatus, or a multi function device (MFD) having a copy function, a facsimile function and a scanner function integrally, for example.

As shown in FIGS. 1 and 2, in the image reading apparatus 1, a document cover 4 including an auto document feeder (ADF) 3 as an automatic document delivery mechanism is attached openably to a document mounting table 2 functioning as an FBS (Flatbed Scanner) through a hinge on a back side (behind a sheet).

An operation panel 5 is provided on a front side of the document mounting table 2. The operation panel 5 includes various operation keys 11 and a liquid crystal display portion 12. A user inputs a desirable command by using the operation panel 5. The image reading apparatus 1 carries out a predetermined operation upon receipt of a predetermined input. The image reading apparatus 1 is also operated in a connection to a computer in accordance with a command transmitted from the computer through a printer driver or a scanner driver in addition to the command input to the operation panel 5.

The operation key 11 includes a mode key for switching respective modes such as a facsimile mode, a copy mode and a scan mode, a power key for turning ON/OFF a power supply of the image reading apparatus 1, a navigation key for determining a retrieval of a telephone book or a speed dial which is registered, a change of a talking volume and volumes of an alarm sound and an input confirmation sound, and various setting operations, a start key for inputting a start of image recording and reading operations, a stop key for inputting a stoppage of various processings, an interruption key for inputting an interruption, and a dial key for inputting a telephone number. A type of the operation key 11 is only illustrative and it is a matter of course that the operation key 11 is not restricted thereto.

The liquid crystal display portion 12 is provided on an almost center of an operation panel 9 in such a manner that a surface thereof is on the level with a surface of the operation panel 5. The liquid crystal display portion 12 is provided in such a manner that a liquid crystal display (LCD) can be visually recognized externally in the operation panel 5. The liquid crystal display portion 12 is electrically connected to a control portion 60 (see FIG. 6) and a predetermined screen is displayed on the liquid crystal display upon receipt of an electric signal from the control portion 60.

As shown in FIG. 2, the document mounting table 2 is provided with platen glasses 20 and 21 on a top face opposed to the document cover 4. When the document cover 4 is opened, the platen glasses 20 and 21 are exposed as upper surfaces of the document mounting table 2. When the document cover 4 is closed, the whole upper surface of the document mounting table 2 including the platen glasses 20 and 21 is covered. An image reading unit 22 is provided in the document mounting table 2 opposite to the platen glasses 20 and 21.

The platen glass 20 serves to mount a document when the image reading apparatus 1 is used as the FBS, and is formed by a transparent glass plate, for example. An opening for exposing the platen glass 20 is formed on a center of the upper surface of the document mounting table 2. A region of the platen glass 20 exposed from the opening serves as a document reading region in the FBS.

The platen glass 21 is placed in a reading position in the case in which the ADF 3 of the image reading apparatus 1 is used, and is formed by a transparent glass plate, for example. An opening for exposing the platen glass 21 is formed in the reading position of the document mounting table 2. The platen glass 21 exposed from the opening is extended in a far direction of the image reading apparatus 1 corresponding to a length in a main scanning direction of the image reading unit 22.

A positioning member 23 is provided between the platen glass 20 and the platen glass 21. The positioning member 23 is a long plate-shaped member extended in the far direction of the image reading apparatus 1 in the same manner as the platen glass 21. The positioning member 23 is used as a positioning reference for a document when the document is to be mounted on the platen glass 20 as a document mounting surface in the FBS. For this reason, a central position and positions of both ends of various document sizes such as an A4 size and a B5 size are displayed on the upper surface of the positioning member 23. The upper surface of the positioning member 23 is provided with a guide surface for deflecting the document passing over the platen glass 21 by the ADF 3 to be scooped and for returning the document to the ADF 3.

The image reading unit 22 is a so-called image sensor for irradiating a light on the document through the platen glasses 20 and 21 from a light source and collecting the light reflected from the document into a light receiving unit through a lens, thereby converting the light into an electric signal. For the image reading unit 22, it is possible to use a contact type CIS (Contact Image Sensor) and a reduced optical system CCD (Charge Coupled Device) image sensor, for example. The image reading unit 22 is provided reciprocably under the platen glasses 20 and 21 by means of a belt driving mechanism as a scanning mechanism and is reciprocated in parallel with the platen glasses 20 and 21 upon receipt of a driving force of a carriage motor.

The document cover 4 is provided with the ADF 3 for sequentially delivering the document from a sheet feed tray 30 (a document mounting portion) to a sheet discharge tray 31 (a document discharging portion) through a document delivery path 32. In a delivering process to be carried out by the ADF 3, the document passes through the reading position on the platen glass 21 and the image reading unit 22 standing by under the platen glass 21 reads the image of the document.

As shown in FIGS. 1 and 2, the document cover 4 is provided with the sheet feed tray 30 and the sheet discharge tray 31 in two stages, that is, upper and lower stages with the sheet feed tray 30 disposed on an upper side. The document from which an image is to be read by the ADF 3 is mounted on the sheet feed tray 30. A plurality of documents is mounted on the sheet feed tray 30 in such a manner that leading ends in a sheet feeding direction are inserted into the sheet delivery path 32 in a stacking state with a first face turned upward. A back side of the apparatus in the sheet feed tray 30 is bent downward so that a protecting wall 26 is formed. A lower end of the protecting wall 26 is coupled to the upper surface of the document cover 4. By the protecting wall 26, it is possible to prevent the document mounted on the sheet discharge tray 31 from dropping when the document cover 4 is opened with respect to the document mounting table 2. In a lower part on the front side of the apparatus in the sheet feed tray 30, a notch 27 is formed in a part of a housing of the ADF 3. By the notch 27, it is possible to enhance a visibility from the front side of the apparatus of the document discharged to the sheet discharge tray 31. In particular, a document having a small size is visually recognized by the sheet feed tray 30 with difficulty. However, a space between the sheet feed tray 30 and the sheet discharge tray 31 is enlarged by means of the notch 27. Consequently, it is possible to particularly enhance the visibility of the document having the small size.

The sheet discharge tray 31 is placed in a position separated in a vertical direction on a lower side of the sheet feed tray 30, and is formed integrally with the upper surface of the document cover 4. The document from which an image is read and which is discharged from the ADF 3 is held to be loaded on the sheet discharge tray 31 with the first face turned downward in a separating state from the document mounted on the sheet feed tray 30. Both side portions 28 to be near and far sides of the apparatus in the sheet discharge tray 31 are slant faces turned upward to both sides. By the both side portions 28, it is possible to slide and pull out the document discharged to the sheet discharge tray 31 along the slant faces of the both side portions 28 in order to press the document from above when it is taken out. Therefore, it is possible to easily take the document out of the sheet discharge tray 31.

As shown in FIG. 2, in the ADF 3, the horizontal document delivery path 32 taking an almost U shape seen in a longitudinal section is formed in such a manner that the sheet feed tray 30 and the sheet discharge tray 31 are coupled to each other through the reading position on the platen glass 21. The document delivery path 32 is continuously formed as a passage having a predetermined width through which the document can pass by means of a member constituting an ADF body, a guide plate or a guide rib. Thus, the sheet feed tray 30 and the sheet discharge tray 31 are provided in the two stages, that is, the upper and lower stages, and the horizontal document delivery path 32 taking the almost U shape is formed as seen in the longitudinal section so as to couple them. Consequently, the width of the ADF 3 can be reduced to decrease a size.

The document delivery path 32 is extended from the sheet feed tray 30 toward one end side (a left side in FIG. 2) of the document cover 4 and is subsequently curved to be inverted downward to reach the reading position on the platen glass 21, and takes an almost U shape in a horizontal direction as seen in the longitudinal section which is extended from the reading position toward the sheet discharge tray 31. The document delivery path 32 is roughly divided into three parts including upper and lower portions 32A and 32C forming a straight portion in two stages, that is, upper and lower stages in the almost U shape, and a curved portion 32B curved to link the upper portion 32A and the lower portion 32C. The document delivery path 32 is used as a delivery path of a document for both a single side reading operation and a double side reading operation for the document which are to be carried out by the ADF 3.

A pickup roller 33 and a separating roller 34 for sequentially feeding the documents mounted on the sheet feed tray 30 are provided in the vicinity of the sheet feed tray 30 of the document delivery path 32. Moreover, the document delivery path 32 is provided with delivery rollers 35A, 35B, 35C and 35D for delivering the document from the sheet feed tray 30 to the sheet discharge tray 31, a sheet discharge roller 36 and a pinch roller 37 to come in pressure contact therewith. A document delivering unit is constituted by the pickup roller 33, the separating roller 34, the delivery rollers 35A, 35B, 35C and 35D, the sheet discharge roller 36 and the pinch roller 37. A driving force is transmitted from a motor 67 (see FIG. 6) as a driving source to each of the rollers constituting the document delivering unit.

As shown in the drawing, the pickup roller 33 and the separating roller 34 are provided in the vicinity of the most upstream of the document delivery path 32. The pickup roller 33 is rotatably provided in a tip portion of an arm 29 having a base end side supported pivotally on a shaft for pivotally supporting the separating roller 34. The separating roller 34 is rotatably provided in a position placed apart in a sheet feeding direction from the pickup roller 33 so as to abut on an opposed surface of the document delivery path 32. The driving force is transmitted from the motor 67 to the pickup roller 33 and the separating roller 34 so that they are rotated and driven, and the driving force is also transmitted from the motor 67 to the arm 29 so that the arm 29 is moved vertically. The pickup roller 33 and the separating roller 34 have diameters which are equal to each other, and are rotated at an equal circumferential speed. A separating pad for separating the document by a friction is provided in an opposed position to the separating roller 34 in pressure contact with a roller face of the separating roller 34.

The delivery rollers 35A, 35B, 35C and 35D are provided in different positions of the document delivery path 32, respectively. In the aspect, the delivery roller 35A is provided on a directly downstream side of the separating roller 34, the delivery roller 35B is provided in the upper portion 32A of the document delivery path 32, the delivery roller 35C is provided in the lower portion 32C of the document delivery path 32 on a directly upstream side of the reading position, and the delivery roller 35D is provided in the lower portion 32C of the document delivery path 32 on a directly downstream side of the reading position. The arrangement is illustrative and the numbers and arrangement of the delivery rollers 35A, 35B, 35C and 35D can be changed properly.

The pinch roller 37 is provided in each of the opposed positions to the delivery rollers 35A, 35B, 35C and 35D. Each pinch roller 37 has a shaft urged elastically by means of a spring and is thus caused to come in pressure contact with the roller face of each of the delivery rollers 35. When each of the delivery rollers 35A, 35B, 35C and 35D is rotated, the pinch roller 37 is also rotated together therewith. The document is caused to come in pressure contact with each of the delivery rollers 35 by each pinch roller 37 so that a rotating force of each of the delivery rollers 35A, 35B, 35C and 35D is transmitted to the document.

The sheet discharge roller 36 is provided in the vicinity of the most downstream of the document delivery path 32, and the driving force is transmitted from the motor 67 so that the sheet discharge roller 36 is rotated and driven in the same manner as the delivery rollers 35A, 35B, 35C and 35D. The pinch roller 37 is also provided in an opposed position to the sheet discharge roller 36, and the pinch roller 37 is urged elastically by means of the spring and is thus caused to come in pressure contact with the sheet discharge roller 36.

A switchback path 39 (a switchback delivery path) is coupled to a coupling position 38 in the lower portion 32C of the document delivery path 32. The switchback path 39 serves to pull in the document having the first face read in the reading position and to invert a leading and a trailing ends, thereby returning the document from the downstream side of the reading position to the document delivery path 32 on the upstream side when the double side reading operation is to be carried out. The switchback path 39 is extended obliquely and upward from the coupling position 38 toward the upper side of the sheet feed tray 30 and crosses the upper portion 32A of the document delivery path 32. The document subjected to the switchback delivery from a crossing position 40 of the upper portion 32A and the switchback path 39 is returned to the document delivery path 32.

A terminal 41 of the switchback path 39 is opened to an external surface of the ADF 3. A document support portion 42 is formed from the terminal 41 of the switchback path 39 to the sheet feed tray 30 side so as to be linked from the terminal 41. The document support portion 42 serves to support the document protruded from the terminal 41 of the switchback path 39, and constitutes an upper cover 6 of the ADF 3 at an upper side of the sheet feed roller 33 and the separating roller 34. The upper cover 6 is formed to wholly cover the ADF 3 including the sheet feed roller 33 and the separating roller 34 and constitutes a housing (an apparatus housing) of the ADF 3. The document support portion 42 constituted as the upper cover 6 is extended from the terminal 41 toward the sheet feed tray 30 side to reach the upstream side of a sheet feeding position through the sheet feed roller 33 and the separating roller 34. In the double side reading operation, consequently, a part of the document entering the switchback path 39 and protruded from the terminal 41 toward the outside of the ADF 3 is supported on the document support portion 41. Therefore, the document can be prevented from being suspended at a downstream side (the right side in FIG. 2) from the sheet feeding position of the document loaded onto the sheet feed tray 30, and can be thus prevented from being disturbed in the sheet feeding position.

The terminal 41 of the switchback path 39 is used as a document insertion port in the second image reading operation to be carried out by temporarily stopping the first image reading operation. The document inserted in the terminal 41 of the switchback path 39 is supported by the document support portion 42 and is mounted on the upper cover 6. The terminal 41 of the switchback path 39 is opened on the upper surface of the upper cover 6 in the ADF 3. In the second image reading operation, therefore, it is possible to easily insert the document from the terminal 41.

A switchback roller 43 is provided on the terminal 41 side from the crossing position 40 of the switchback path 39. The driving force is transmitted from the motor 67 to the switchback roller 43 so that the switchback roller 43 is rotated and driven in both normal and reverse directions. A pinch roller 44 is provided in an opposed position to the switchback roller 43. The pinch roller 44 has a shaft urged elastically by means of a spring and is thus caused to come in pressure contact with a roller face of the switchback roller 43, and is rotated together with the rotation of the switchback roller 43. The document is caused to come in pressure contact with the switchback roller 43 by means of the pinch roller 44 so that the rotating force of the switchback roller 43 is transmitted to the document. By the switchback roller 43 and the pinch roller 44, a switchback delivering unit for switchback delivering the document is implemented.

A leading end of the document for the second image reading operation which is inserted in the terminal 41 of the switchback path 39 abuts on a nip position of the switchback roller 43 and the pinch roller 44 so that an inserting position is regulated. When the switchback roller 43 is rotated in the abutment state, the document for the second image reading operation is fed to the switchback path 39. Accordingly, the switchback roller 43 and the pinch roller 44 also serve as a feeding unit in the second image reading operation.

While the switchback path 39 coupled to the coupling position 38 on the downstream side of the reading position of the document delivery path 32 is caused to cross the upper portion 32A of the document delivery path 32 and the terminal 41 is thus opened above the sheet feed tray 30 in order to easily insert the document over which the second image reading operation is to be carried out in this aspect, the delivery path of the switchback path 39 can also employ another shape and it is also possible to properly change the delivery passage for the switchback path which is coupled to a predetermined position of the document delivery path 32 and serves to return the document from the downstream side of the reading position to the upstream side of the reading position with the leading and the trailing end in the document inverted.

Figure 3:
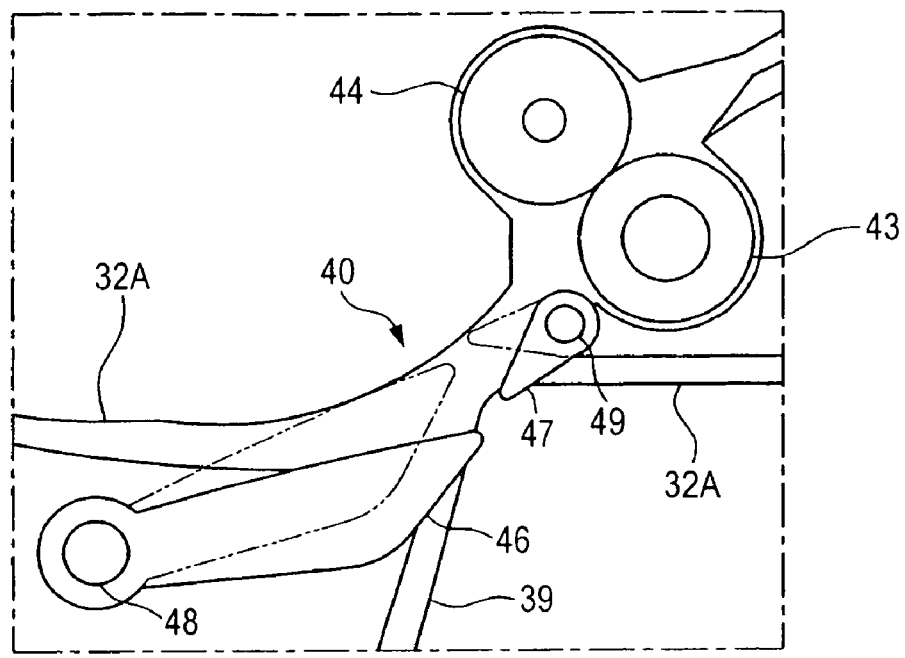
FIG. 3 is an enlarged view showing a structure of a crossing position.

As shown in FIGS. 2 and 3, a guide flap 46 and a guide flap 47 which serve to guide the document to a desirable delivery path are provided in the crossing position 40. The guide flap 46 is provided rotatably within a predetermined range around a shaft 48 provided in a corner portion (a left and lower side in FIG. 3) on the reading position side of the document delivery path 32 and the coupling position 38 side of the switchback path 39 in the crossing position 40. The guide flap 46 is a blade-shaped plate and has a tip protruded to the crossing position 40. Although only one guide flap 46 is shown in the drawing, a plurality of guide flaps 46 taking the same shape is provided at a predetermined interval in a transverse direction of the document delivery path 32 (a perpendicular direction to the sheet in FIG. 3, an inner direction of the apparatus). The guide flaps 46 are rotated integrally.

The guide flap 46 changes a posture into a third guide posture shown in a solid line and a fourth guide posture shown in a two-dotted chain line in FIG. 3 by a rotation around the shaft 48. The guide flap 46 abuts on the document delivery path 32 or a guide member of the switchback path 39, for example, and is thus controlled to be rotated downward from the third guide posture and to be rotated upward from the fourth guide posture. The guide flap 46 takes the third guide posture so that a delivery path from the sheet feed tray 30 side (a right side in FIG. 3) of the document delivery path 32 to a reading position side (a left side in FIG. 3) is provided continuously, and furthermore, a delivery path from the document delivery path 32 to the coupling position 38 side (a lower side in FIG. 3) of the switchback path 39 is closed. Consequently, the document reaching the crossing position 40 from the sheet feed tray 30 side of the document delivery path 32 is permitted to enter the reading position side of the document delivery path 32 and is prohibited to enter the coupling position 38 side of the switchback path 39. Moreover, the document reaching the crossing position 40 from the terminal 41 side (an upper side in FIG. 3) of the switchback path 39 is permitted to enter the reading position side of the document delivery path 32 and is prohibited to enter the coupling position 38 side of the switchback path 39.

When the guide flap 46 takes the fourth guide posture, a delivery path from the coupling position 38 side of the switchback path 39 to the terminal 41 side is provided continuously, and furthermore, a delivery path from the coupling position 38 side of the switchback path 39 to the reading position side of the document delivery path 32 is closed. Consequently, the document reaching the crossing position 40 from the coupling position 38 side of the switchback path 39 is permitted to enter the terminal 41 side of the switchback path 39 and is prohibited to enter the reading position side of the document delivery path 32.

The delivery path is switched by the guide flap 46 through an abutment of the document. The guide flap 46 always takes the third guide posture shown in a solid line of FIG. 3 by a dead weight thereof or upon receipt of an energizing force of an elastic member such as a spring. The document delivered from the coupling position 38 toward the crossing position 40 through the switchback path 39 abuts on the guide flap 46 so that the guide flap 46 is rotated to be pushed upward in the drawing and thus takes the fourth guide posture shown in the two-dotted chain line of FIG. 3. On the other hand, the document delivered from the terminal 41 side of the switchback path 39 to the crossing position 40 abuts on the guide flap 46 and the guide flap 46 is controlled so as not to be rotated downward in the drawing from the third guide posture. For this reason, the document is guided to the guide flap 46 and enters the reading position side through the upper portion 32A of the document delivery path 32. The shape of the blade of the guide flap 46 easily changes the posture by the abutment of the document delivered from the coupling position 38 side of the switchback path 39 to the crossing position 40, and there is employed such a shape that the document delivered from the terminal 41 side of the switchback path 39 to the crossing position 40 is easily guided to the reading position side of the document delivery path 32. If the posture of the guide flap 46 is changed by the abutment of the document, thus, the guide flap 46 does not need to positively change the posture by the application of the driving force from the motor 67. Therefore, it is possible to implement the guide flap 46 with a simple structure.

The guide flap 47 is provided rotatably within a predetermined range around a shaft 49 provided in the corner portion (the right and upper side in FIG. 3) of the sheet feed tray 30 side of the document delivery path 32 and the terminal 41 side of the switchback path 39 in the crossing position 40. The guide flap 47 is a blade-shaped plate and has a tip protruded to the crossing position 40. Although only one guide flap 47 is shown in the drawing, a plurality of guide flaps 47 taking the same shape is provided at a predetermined interval in the transverse direction of the document delivery path 32. The guide flaps 47 are rotated integrally.

The guide flap 47 changes a posture into a fifth guide posture shown in a solid line and a sixth guide posture shown in a two-dotted chain line in FIG. 3 by a rotation around the shaft 49. The guide flap 47 abuts on the document delivery path 32 or the guide member of the switchback path 39, for example, and is thus controlled to be rotated rightward from the fifth guide posture and to be rotated upward from the sixth guide posture. The guide flap 47 takes the fifth guide posture so that a delivery path from the terminal 41 side of the switchback path 39 to the reading position side of the document delivery path 32 is provided continuously, and furthermore, a delivery path from the coupling position 38 side of the switchback path 39 to the sheet feed tray 30 side of the document delivery path 32 is closed. Consequently, the document reaching the crossing position 40 from the terminal 41 side of the switchback path 39 is permitted to enter the reading position side of the document delivery path 32 and is prohibited to enter the sheet feed tray 30 side. Moreover, the document reaching the crossing position 40 from the coupling position 38 side of the switchback path 39 is permitted to enter the terminal 41 side of the switchback path 39 and is prohibited to enter the sheet feed tray 30 side of the document delivery path 32.

When the guide flap 47 takes the sixth guide posture, a delivery path from the sheet feed tray 30 side of the document delivery path 32 to the reading position side is provided continuously, and furthermore, a delivery path from the sheet feed tray 30 side of the document delivery path 32 to the terminal 41 side of the switchback path 39 is closed. Consequently, the document reaching the crossing position 40 from the sheet feed tray 30 side of the document delivery path 32 is permitted to enter the reading position side of the document delivery path 32 and is prohibited to enter the terminal 41 side of the switchback path 39.

The delivery path is switched by the guide flap 47 through an abutment of the document. The guide flap 47 always takes the fifth guide posture shown in the solid line of FIG. 3 by a dead weight thereof or upon receipt of an energizing force of an elastic member such as a spring. The document delivered from the sheet feed tray 30 side of the document delivery path 32 abuts on the guide flap 47 so that the guide flap 47 is rotated to be pushed leftward in the drawing and thus takes the sixth guide posture shown in the two-dotted chain line of FIG. 3. On the other hand, even if the document delivered from the coupling position 38 side of the switchback path 39 to the crossing position 40 abuts on the guide flap 47, the guide flap 47 is controlled so as not to be rotated rightward in the drawing from the fifth guide posture. For this reason, the document is guided to the guide flap 47 and enters the terminal 41 side of the switchback path 39. The shape of the blade of the guide flap 46 easily changes the posture by the abutment of the document delivered from the sheet feed tray 30 side of the document delivery path 32 to the crossing position 40, and there is employed such a shape that the document delivered from the coupling position 38 side of the switchback path 39 to the crossing position 40 is easily guided to the terminal 41 side of the switchback path 39. If the posture of the guide flap 47 is changed by the abutment of the document, thus, the guide flap 47 does not need to positively change the posture by the application of the driving force from the motor 67. Therefore, it is possible to implement the guide flap 47 with a simple structure.

Figure 4:
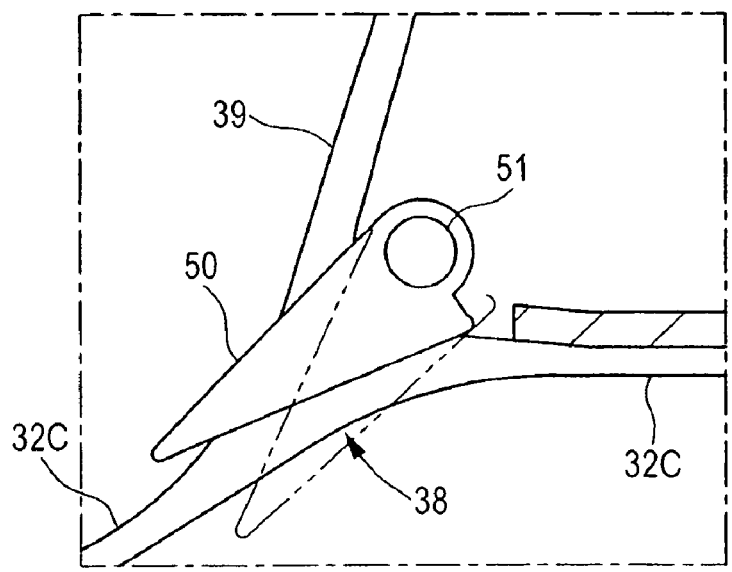
FIG. 4 is an enlarged view showing a structure of a coupling position.

As shown in FIGS. 2 and 4, a guide flap 50 is provided in the coupling position 38. The guide flap 50 is provided rotatably around a shaft 51, and the driving force is transmitted thereto from the motor 67 so that the guide flap 50 is rotated into a first guide posture shown in a solid line and a second guide posture shown in a two-dotted chain line in FIG. 4. By an abutment on the document delivery path 32 or the guide member of the switchback path 39, for example, the guide flap 50 is controlled to be rotated upward from the first guide posture and to be rotated downward from the second guide posture. In the case in which the guide flap 50 takes the first guide posture, a delivery path from the reading position side (a left side in FIG. 4) of the document delivery path 32 to the sheet discharge tray 31 side (a right side in FIG. 4) is provided continuously. Consequently, the document passing through the reading position is guided from the lower portion 32C of the document delivery path 32 toward the sheet discharge tray 31 through the coupling position 38. In the case in which the guide flap 50 takes the second guide posture, a delivery path from a downstream side of the reading position of the lower portion 32C of the document delivery path 32 to the switchback path 39 is provided continuously. Consequently, the document passing through the reading position is guided through the coupling position 38 to enter the switchback path 39. Thus, the guide flap 50 is provided to freely guide the document in the coupling position 38 to either the document delivery path 32 or the switchback path 39. Although only one guide flap 50 is shown in the drawing, a plurality of guide flaps 50 taking the same shape is provided at a predetermined interval in the transverse direction of the document delivery path 32. The guide flaps 50 are rotated integrally.

As shown in FIG. 2, a plurality of sensors for detecting the delivery of the document is provided in the document delivery path 32 and the switchback path 39. In detail, the document delivery path 32 is provided with a first front sensor 52 and a second front sensor 53 on upstream and downstream sides of the separating roller 34 respectively, and a rear sensor 54 is provided on a directly upstream side of the reading position. A switchback sensor 55 is provided between the coupling position 38 of the switchback path 39 and the crossing position 40. Moreover, an interrupt document sensor 45 for detecting an interruption document is provided in the vicinity of the terminal 41 of the switchback path 39. These sensors are so-called optical sensors and have the same structure except that shapes of detectors are varied due to a difference in a position for detection. Therefore, description will be given to the structure by taking the interrupt document sensor 45 as an example.

Figure 5:
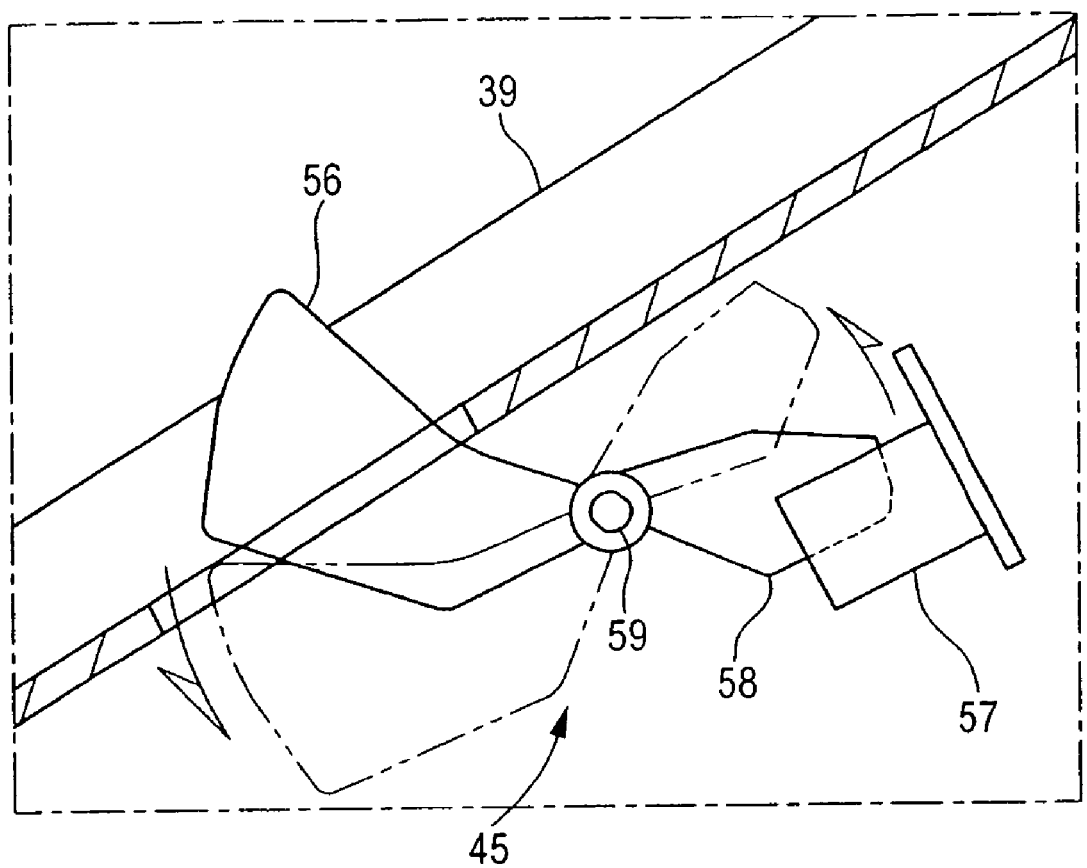
FIG. 5 is an enlarged view showing a structure of an interruption document sensor.

The interrupt document sensor 45 is configured by a detector 56 protruded from a lower surface of the switchback path 39 and rotated to retreat from the switchback path 39 by a contact with the interrupt document, and a photointerruptor 57 for detecting the rotation of the detector 56 as shown in FIG. 5. A shielding portion 58 to be detected by the photointerruptor 57 is formed integrally with the detector 56 and is provided rotatably around a shaft 59. The detector 56 is elastically urged to a position in which the detector 56 is protruded from the document delivery path 39 (32), that is, in a clockwise direction in the drawing by an urging member such as a spring which is not shown. In a state in which an external force is not applied to the detector 56, the detector 56 is protruded from the document delivery path 39 (32) and the shielding portion 58 is positioned between a light emitting portion and a light receiving portion in the photointerruptor 57 as shown in a solid line in the drawing. Consequently, a light transfer of the photointerruptor 57 is blocked so that the interrupt document sensor 45 is turned OFF.

When the interrupt document is inserted from the terminal 41 of the switchback path 39, it abuts on the detector 56, thereby rotating the detector 56 to retreat from the switchback path 39. The shielding portion 58 is also rotated together with the detector 56 and thus separates from the portion between the light emitting portion and the light receiving portion in the photointerruptor 57 as shown in a two-dotted chain line in the drawing. Consequently, the light transfer of the photointerruptor 57 can be prevented from being blocked so that the interrupt document sensor 45 is turned ON. By the ON/OFF operations of the interrupt document sensor 45, it is detected whether the interrupt document is inserted in the terminal 41 of the switchback path 39 or not.

The first front sensor 52 provided on the direct upstream of the separating roller 34 serves to detect whether the document is mounted on the sheet feed tray 30 or not depending on ON/OFF operations thereof. When the document is mounted on the sheet feed tray 30, the first front sensor 52 is turned ON. When the document is gone from the sheet feed tray 30, the first front sensor 52 is turned OFF.

The second front sensor 53 provided on the direct downstream of the separating roller 34 serves to detect the leading or the trailing end in the document fed to the document delivery path 32 depending on the ON/OFF operations. For example, the second front sensor 53 monitors the numbers of rotations of the delivery rollers 35A, 35B, 35C and 35D after the detection of the trailing end of the document by means of an encoder or based on the number of steps of the motor 67, thereby determining a position of the leading or the trailing end of the document in the document delivery path 32.

The rear sensor 54 provided on the direct upstream of the reading position serves to detect the leading and the trailing end of the document delivered through the document delivery path 32 depending on the ON/OFF operations. The rear sensor 54 monitors the numbers of rotations of the delivery rollers 35A, 35B, 35C and 35D after the detection of the leading or the trailing end of the document by means of an encoder or based on the number of steps of the motor 67, thereby determining whether the leading or the trailing end of the document reaches the reading position or not. The image reading operation of the image reading unit 22 is controlled based on a signal of the rear sensor 54, and starts to read an image when the leading end of the document reaches the reading position and ends to read the image when the trailing end of the document reaches the reading position.

The switchback sensor 55 provided between the coupling position 38 of the switchback path 39 and the crossing position 40 serves to detect the leading or the trailing end of the document delivered through the switchback path 39 depending on the ON/OFF operations. For example, the switchback sensor 55 monitors the numbers of rotations of the delivery rollers 35A, 35B, 35C and 35D and the switchback roller 43 after the detection of the trailing end of the document by means of an encoder or based on the number of steps of the motor 67, thereby determining whether the trailing end of the document passes through the crossing position 40 or not.

Figure 6:
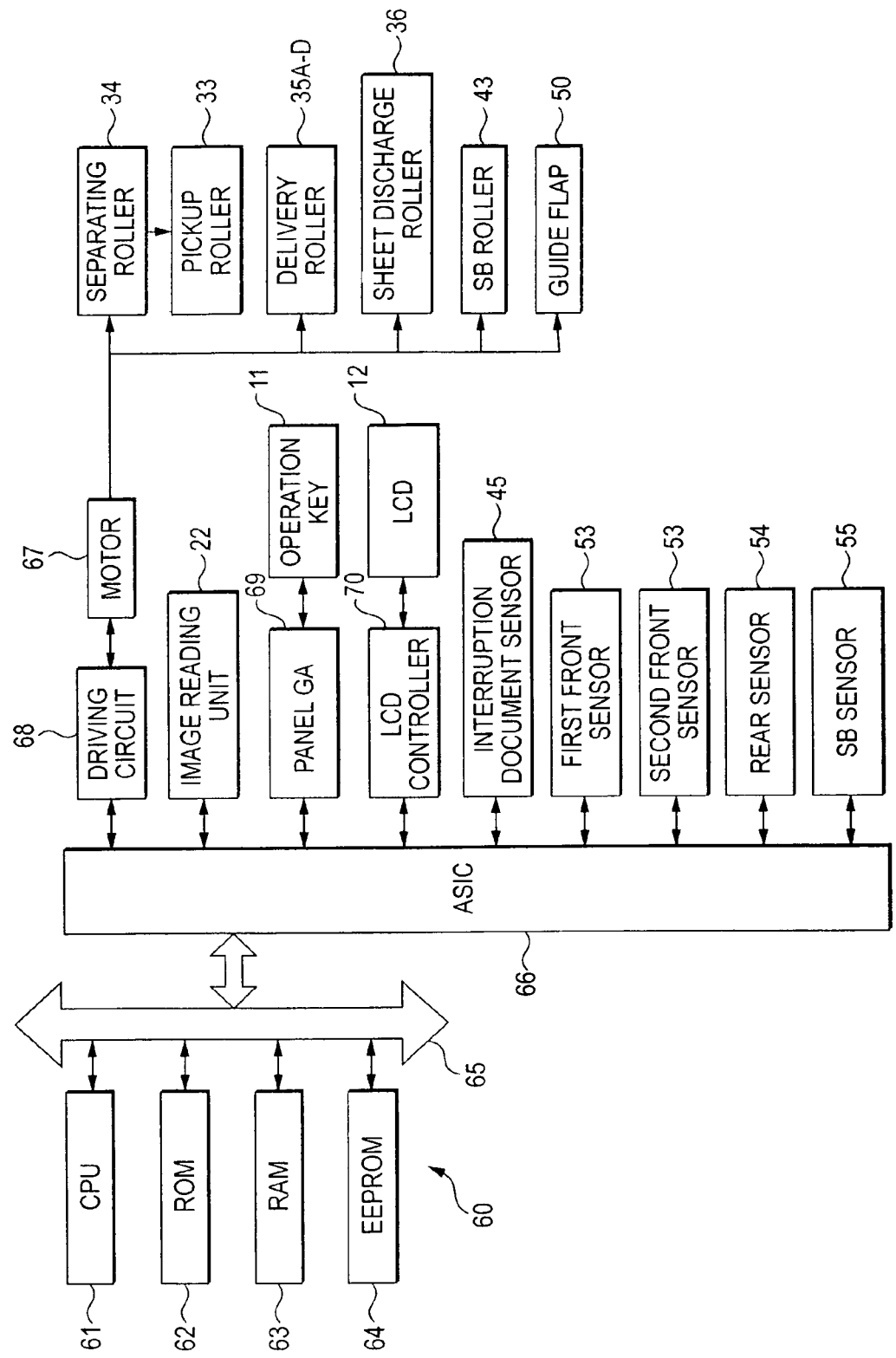
FIG. 6 is a block diagram showing a structure of a control portion.

FIG. 6 shows a structure of a control portion 60 (control means) of the image reading apparatus 1. The control portion 60 is constituted as a microcomputer which mainly includes a CPU 61, an ROM 62, an RAM 63 (storage means) and an EEPROM (Electrically Erasable and Programmable ROM) 64 as shown in the drawing, and is connected to an ASIC (Application Specific Integrated Circuit) 66 through a bus 65.

The ROM 62 stores a program for controlling various operations of the image reading apparatus 1. The RAM 63 is used as a storage region or a working region for temporarily recording various data to be used when the CPU 61 executes the program. The EEPROM 64 is a storage region for storing various sets and flags which are to be held to be recorded also after a power supply is turned OFF.

The ASIC 66 generates a relative exciting signal to be conducted to the motor 67 in accordance with a command sent from the CPU 61 and sends the same signal to a driving circuit 68 of the motor 67, and sends a driving signal to the motor 67 through the driving circuit 68, thereby controlling the rotation of the motor 67. The motor 67 serves to apply the driving force to the pickup roller 33, the separating roller 34, the delivery rollers 35A, 35B, 35C and 35D, the sheet discharge roller 36, the switchback roller (SB roller) 43 and the guide flap 50 by a rotation in both normal and reverse directions, and is a driving source in the ADF 3.

The driving circuit 68 serves to drive the motor 67 and forms an electric signal for rotating the motor 67 upon receipt of a signal output from the ASIC 66. The motor 67 is rotated in a predetermined rotating direction at a predetermined rotating speed upon receipt of the electric signal and the rotating force of the motor 67 is transmitted to the pickup roller 33, the separating roller 34, the delivery rollers 35A, 35B, 35C and 35D, the sheet discharge roller 36, the switchback roller 43 and the guide flap 50 through a driving force transmitting mechanism, respectively.

The image reading unit 22 for reading the image of the document delivered to the reading position by the ADF 3 is connected to the ASIC 66. Based on a control program stored in the ROM 62, the image reading unit 22 reads the image of the document. A driving mechanism for reciprocating the image reading unit 22 is also operated upon receipt of the signal output from the ASIC 66, which is not shown.

The interruption document sensor 45, the first front sensor 52, the second front sensor 53, the rear sensor 54 and the switchback sensor 55 are connected to the ASIC 66. The CPU 61 causes the ASIC 66 to send a predetermined output signal to operate the motor 67 and the image reading unit 22 based on the control program stored in the ROM 62 upon receipt of the ON/OFF operations of each of the sensors.

A panel gate array 69 for controlling the operation key 11 to input a desirable command to the image reading apparatus 1 is connected to the ASIC 66. The panel gate array 69 detects the press-down of the operation key 11, thereby outputting a predetermined code signal. The key code is assigned corresponding to a plurality of operation keys 11. The CPU 61 carries out a control processing to be executed in accordance with a predetermined key processing table upon receipt of the predetermined key code from the panel gate array 69. The key processing table is obtained by a correspondence of the key code to the control processing, and is stored in the ROM 62, for example. In the aspect, the "interruption" key of the operation key 11 is a stoppage request unit for giving a request for stopping the first image reading operation, the "start" key in the interrupting operation is second image reading start request means for giving a request for starting the second image reading operation during the stoppage of the first image reading operation, and the "start" key in a state in which the interrupting operation is released is assigned as first image reading restart request means for giving a request for restarting the first image reading operation which is stopped. It is apparent that the assignment of the operation key 11 is optional and the type of an operation key 10 can be changed properly.

An LCD controller 70 for controlling a screen display of the liquid crystal display portion 12 is connected to the ASIC 66. The LCD controller 70 causes the liquid crystal display portion 12 to display, on a screen, information about the operation of the image reading apparatus 1 based on a command of the CPU 61. For example, the control portion 60 is brought into an interrupting operation state when the "interruption" key is pressed down, and the control portion 60 releases the interrupting operation when the "interruption" key is pressed down again. In such a case, whether the image reading apparatus 1 is carrying out the interrupting operation is displayed on the liquid crystal display portion 12.

Figure 7:
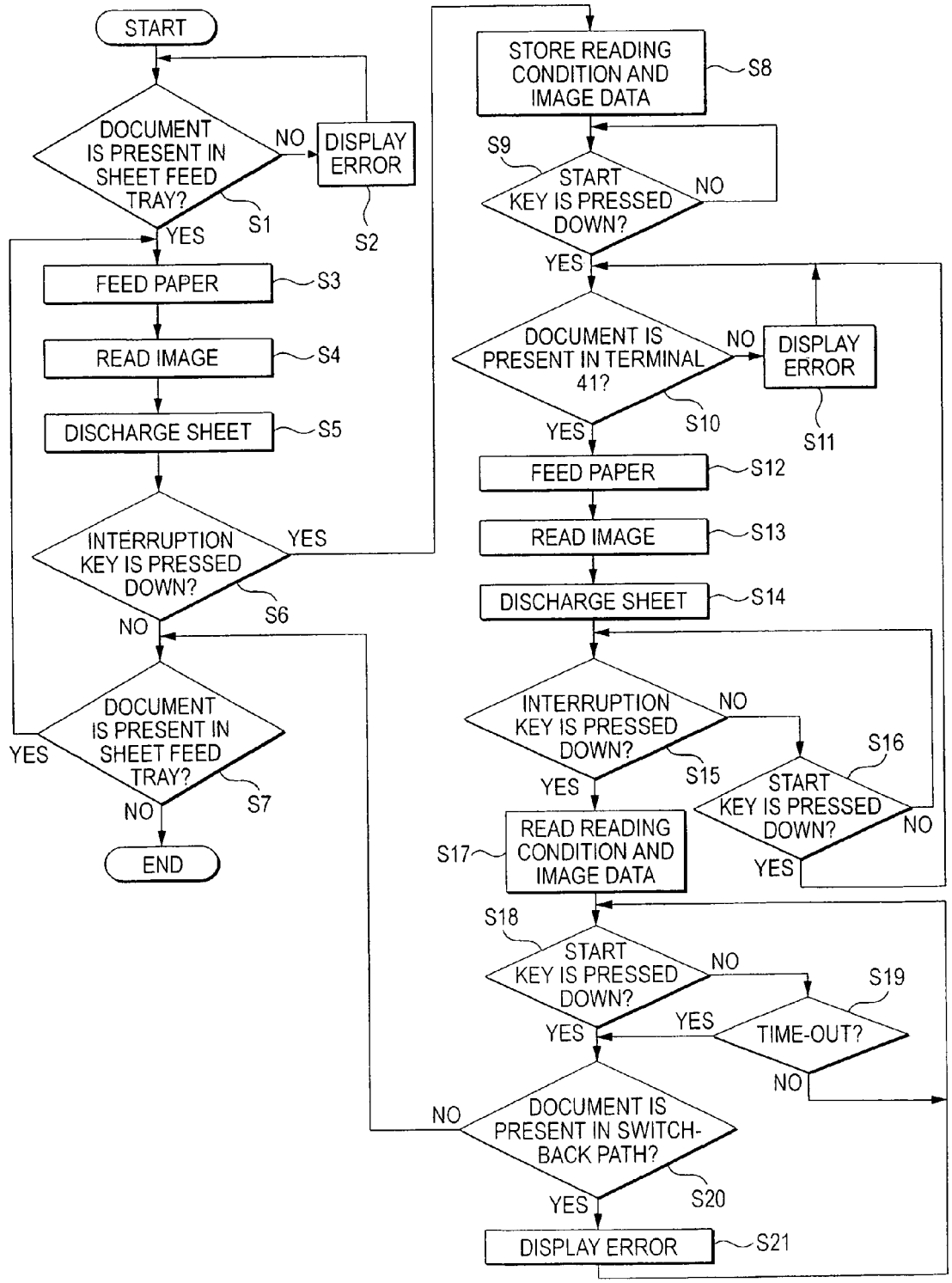
FIG. 7 is a flowchart showing an image reading operation.

The image reading operation to be carried out by the image reading apparatus 1 will be described below. FIG. 7 is a flowchart showing the image reading operation and FIGS. 8 to 19 are views showing each state in the image reading operation.

The image reading apparatus 1 can be used as both the FBS and the ADF 3. Since the use for the FBS is not particularly related to the invention, detailed description will be omitted. In the case in which the ADF 3 is used, the document cover 4 is maintained to be closed with respect to the document mounting table 2. The opening and closing operations of the document cover 4 are detected by a sensor provided in the document mounting table 2. When the document cover 4 is closed, the ADF 3 is controlled to be usable. A document Gn to be read is mounted on the sheet feed tray 30. The document Gn is mounted on the sheet feed tray 30 in so-called face-up in such a manner that a face to be read (the first face) is placed on an upper side. Moreover, at least one document Gn is preferable. For example, in the case in which the images of the documents Gn having the same size are to be read, they are mounted on the sheet feed tray 30 in such a manner that a first face of a first document G1 is turned upward, that is, in a superposing and aligning state in face-up.

When a command for starting the reading operation is input to the image reading apparatus 1, the control portion 60 determines whether the document Gn is mounted on the sheet feed tray 30 or not (S1). The presence of the document Gn mounted on the sheet feed tray 30 is determined depending on the ON/OFF operations of the first front sensor 52. If the document Gn is not mounted on the sheet feed tray 30, the control portion 60 causes the liquid crystal display portion 12 to display an error indicating that the document is not set (S2).

If the document Gn is set onto the sheet feed tray 30, the control portion 60 drives the motor 67 and rotates and drives the pickup roller 33, the separating roller 34, the delivery rollers 35A, 35B, 35C and 35D, the sheet discharge roller 36 and the switchback roller 43 in a predetermined timing to feed the document G1 in an uppermost position (S3). In the feed of the sheet, the arm 29 is moved downward so that the pickup roller 33 comes in pressure contact with the document G1 mounted on the sheet feed tray 30. Then, the documents are separated one by one from the document G1 in the uppermost position for directly receiving the rotating forces of the pickup roller 33 and the separating roller 34 and are fed into the document delivery path 32.

The documents Gn fed sequentially are guided to the document delivery path 32 and are delivered to the reading position, and the image of the document Gn is read by the image reading unit 22 standing by below the reading position (S4 : the first image reading operation). Thereafter, the document Gn from which the image is completely read is discharged to the sheet discharge tray 31 (S5). In such an image reading operation, the delivery path for the document Gn is varied in both the case in which the either side of the document Gn is read and the case in which the both sides of the document Gn are read. Whether the either side or both sides of the document Gn is/are to be read is determined depending on a single side reading mode or a double side reading mode which is preset before the start of the reading operation is input.

Figure 8:
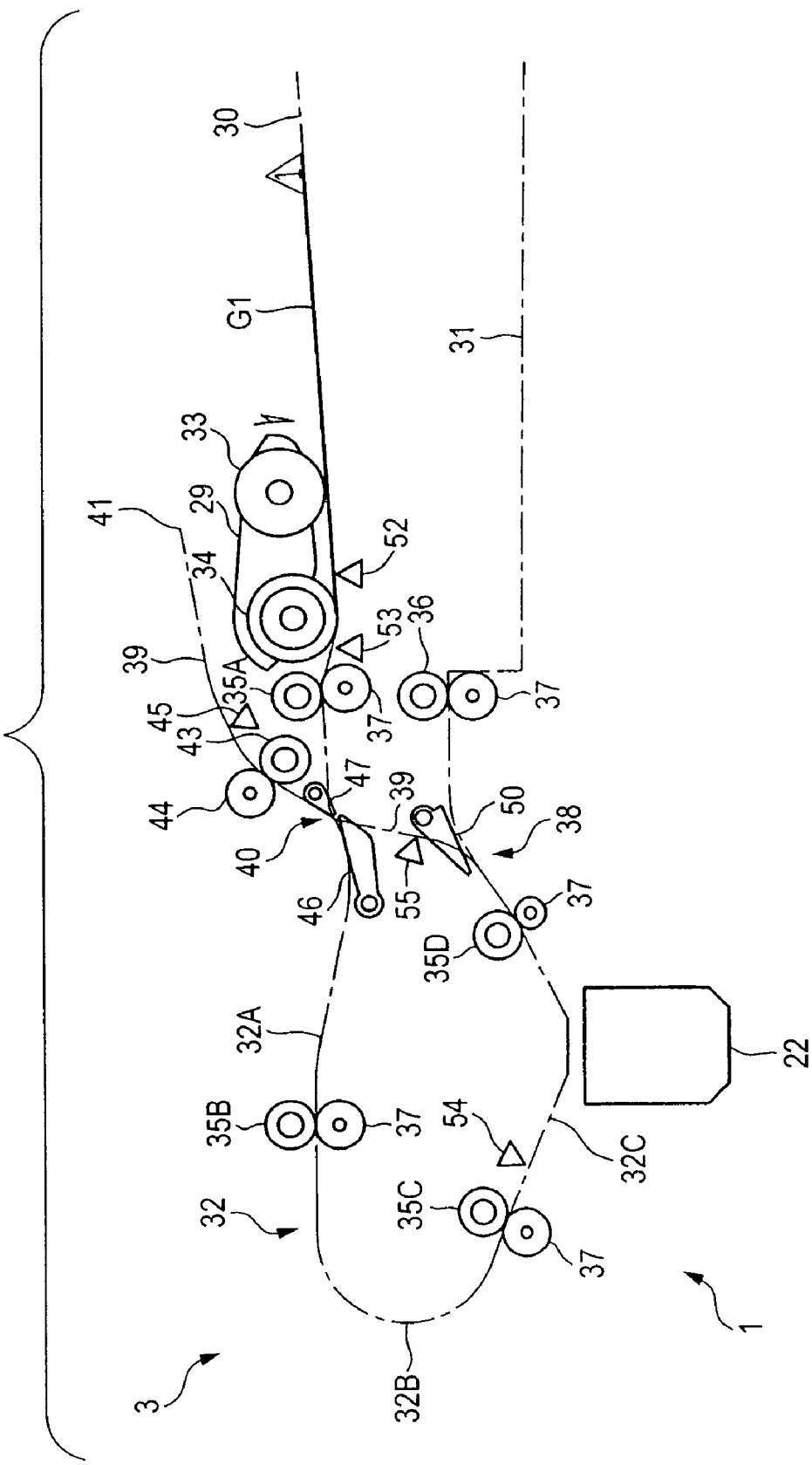
FIG. 8 is a schematic view showing an image reading operation in a single side reading mode.

The single side reading mode will be described below. Before the reading start, the guide flap 50 is placed in a position in which the delivery path in the coupling position 38 is linked from the reading position side of the document delivery path 32 to the sheet discharge tray 31 side as shown in FIG. 8. The guide flap 46 takes the third guide posture, that is, is placed in a position in which the delivery path in the crossing position 40 is provided continuously from the sheet feed tray 30 side of the document delivery path 32 to the reading position side in a state in which the document Gn does not abut thereon. The guide flap 47 takes the fifth guide posture, that is, is placed in a position in which the delivery path 32 in the crossing position 40 is provided continuously from the terminal 41 side of the switchback path 39 to the reading position side of the document delivery path 32 in a state in which the document Gn does not abut thereon.

When the "start" key of the operation panel 5 is pressed down, a driving force is transmitted from the motor 67 to the arm 29 so that the arm 29 is moved downward. Consequently, the pickup roller 33 comes in pressure contact with the document G1 mounted on the sheet feed tray 30. Moreover, the driving force is transmitted from the motor 67 to the pickup roller 33 and the separating roller 34 so that the pickup roller 33 and the separating roller 34 are rotated in a feeding direction. Consequently, the document G1 is reeled into the document delivery path 32. In some cases in which a plurality of documents Gn is mounted on the sheet feed tray 30, a document G2 provided directly thereunder is also fed together with the document G1 in the uppermost position. However, the document G2 is controlled by a separating pad provided in an opposed position to the separating roller 34.

In the document delivery path 32, the driving force is transmitted from the motor 67 to the delivery rollers 35A, 35B, 35C and 35D and the sheet discharge roller 36 so that each roller is rotated in order to deliver the document Gn from the upstream side to the downstream side of the document delivery path 32, that is, in the delivery direction. The document G1 fed from the sheet feed tray 30 to the document delivery path 32 is nipped between the delivery roller 35A and the pinch roller 37 so that the rotating force is transmitted. Consequently, the document G1 is delivered to the crossing position 40 through the document delivery path 32. The document G1 is fed to the document delivery path 32 so that the second front sensor 53 is turned ON.

Figure 9:
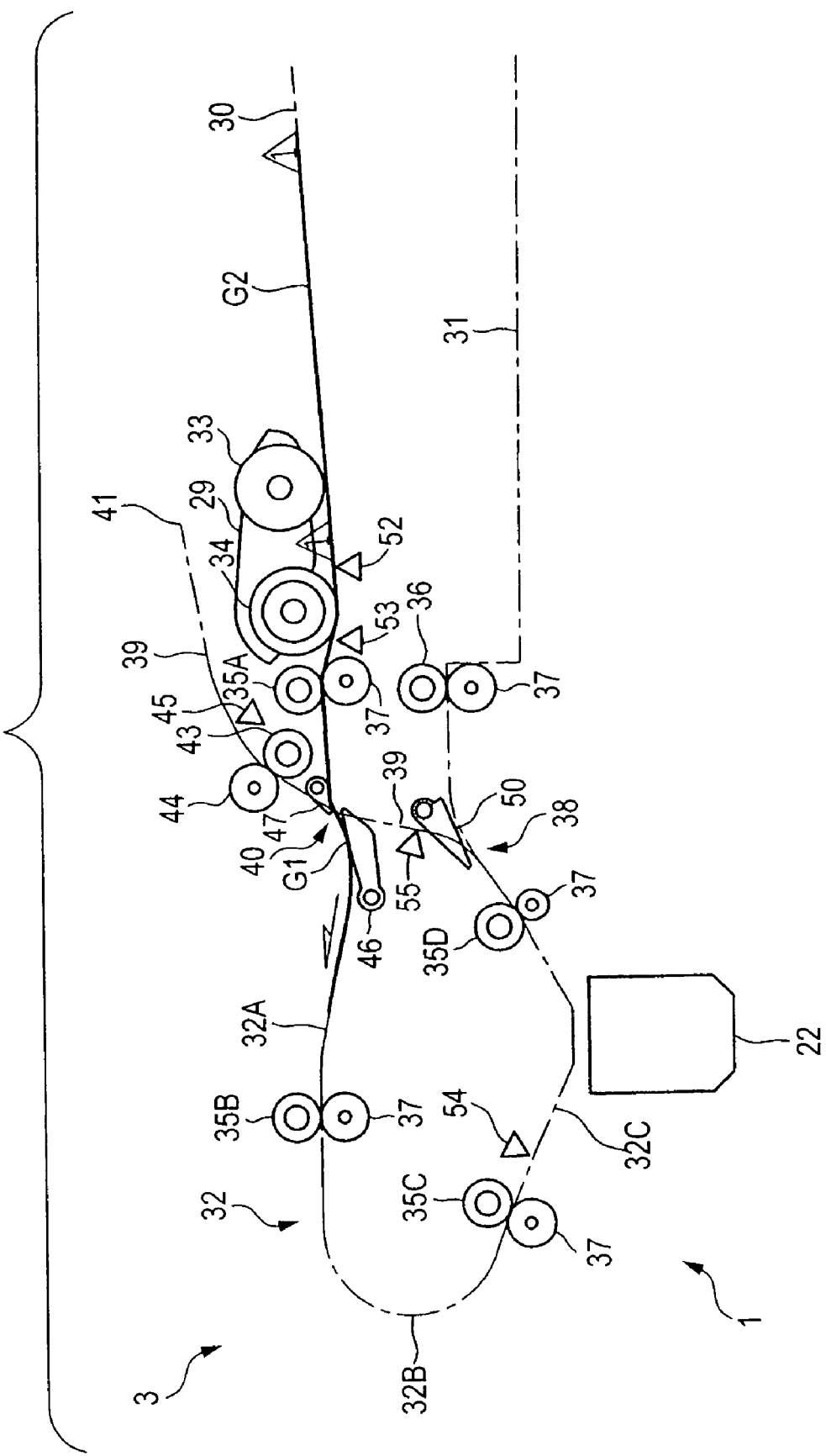
FIG. 9 is a schematic view showing the image reading operation in the single side reading mode.

The guide flap 47 closes the delivery path from the sheet feed tray 30 side of the document delivery path 32 to the crossing position 40. Therefore, the document G1 to be delivered to the crossing position 40 abuts on the guide flap 47. As shown in FIG. 9, the guide flap 47 changes the posture from the fifth guide posture to the sixth guide posture so as to be pushed against the document G1 delivered through the document delivery path 32. Consequently, the delivery path is provided continuously from the sheet feed tray 30 side of the document delivery path 32 to the reading position side, and furthermore, the delivery path to the terminal 41 side of the switchback path 39 is closed. Moreover, the delivery path to the coupling position 38 side of the switchback path 39 is closed by the guide flap 46. Accordingly, the document G1 reaching the crossing position 40 from the sheet feed tray 30 side of the document delivery path 32 is guided to the guide flap 46 and the guide flap 47 and does not advance in any direction of the switchback path 39 but is delivered to the reading position side of the document delivery path 32.

Figure 10:
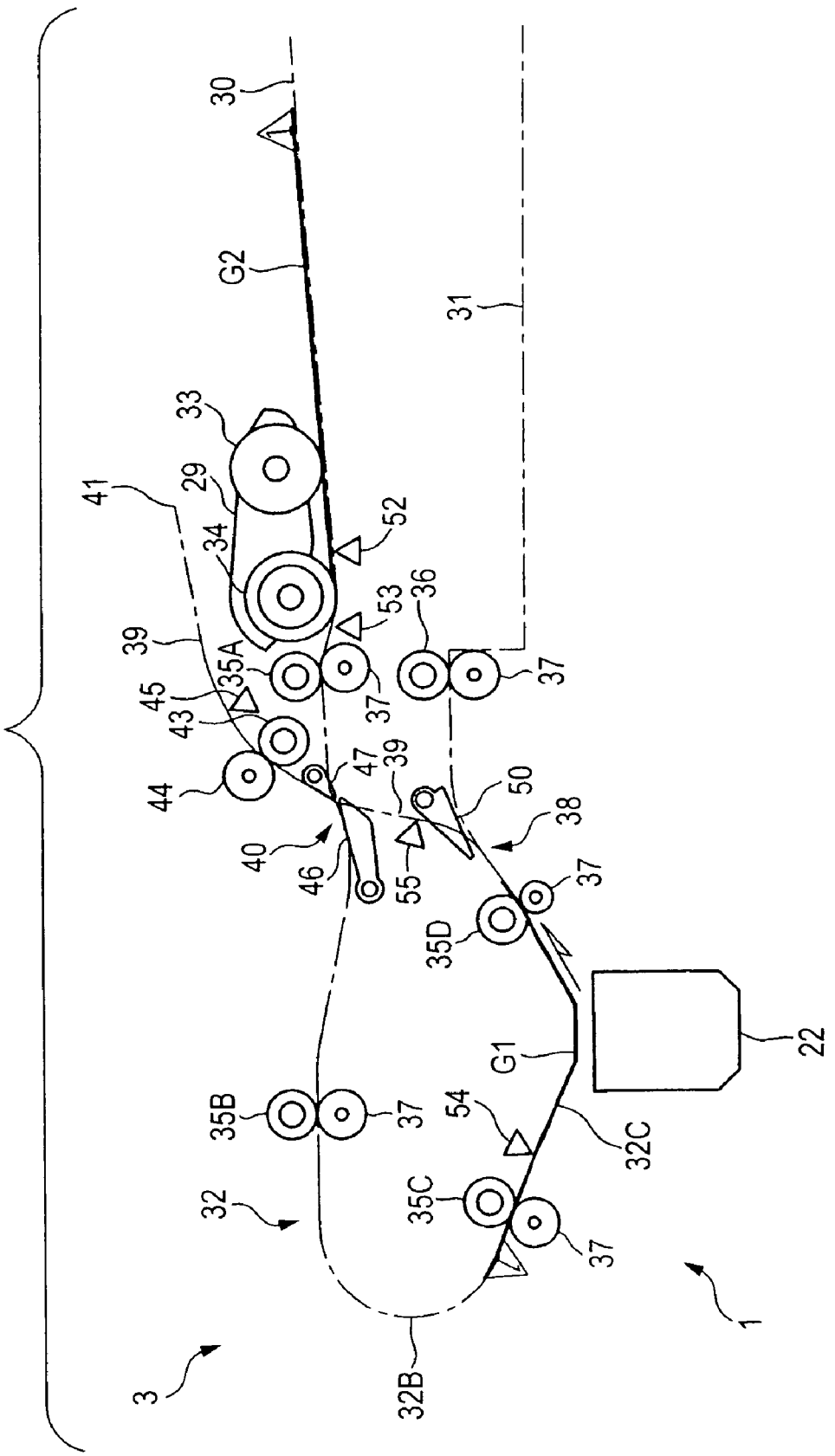
FIG. 10 is a schematic view showing the image reading operation in the single side reading mode.

As shown in FIG. 10, the document G1 is delivered to be inverted downward by the curved portion 32B of the document delivery path 32 and the rear sensor 54 detects the leading end in the delivery direction of the document G1 and is thus turned ON. The leading end in the delivery direction of the document G is detected by the rear sensor 54 and reaches the reading position after a predetermined time passes. If the leading end in the delivery direction of the document G1 reaches the reading position, therefore, the control portion 60 operates the image reading unit 22, thereby reading the image of the document G1. The document G1 passes through the reading position with the first face opposed to the image reading unit 22 so that an image of the first face of the document G is read by the image reading unit 22. The rear sensor 54 is turned OFF when detecting the trailing end in the delivery direction of the document G1. The control portion 60 ends to read the image of the document G1 by the image reading unit 22 after a predetermined time passes since the rear sensor 54 is turned OFF.

Figure 11:
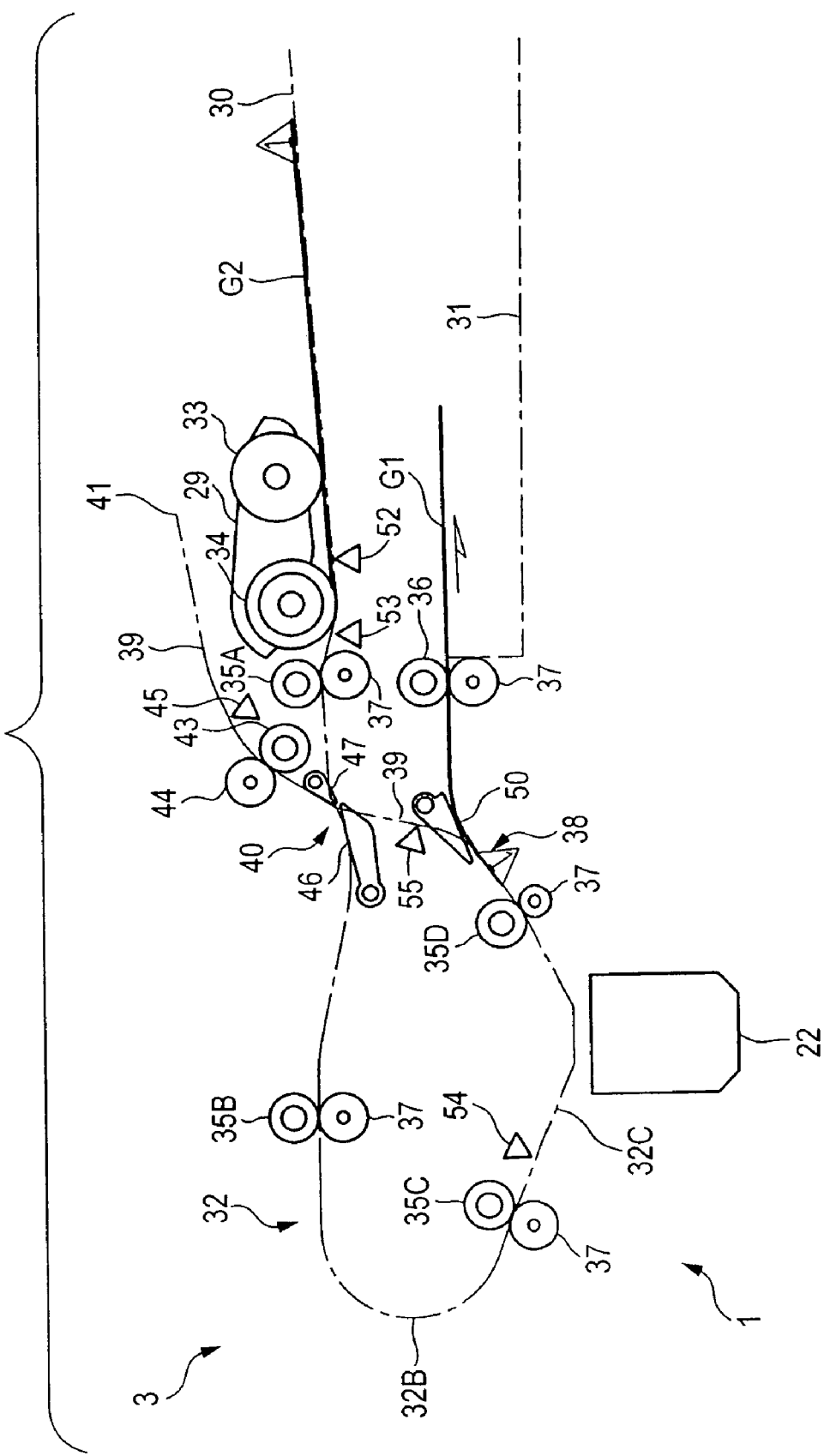
FIG. 11 is a schematic view showing the image reading operation in the single side reading mode.

As shown in FIG. 11, the guide flap 50 takes the first guide posture and guides the document G1 to the sheet discharge tray 31 side of the document delivery path 32 in the coupling position 38. The sheet discharge roller 36 and the pinch roller 37 nip the document G1 and discharge the document G1 from the document delivery path 32 to the sheet discharge tray 31. If the second document G2 is mounted on the sheet feed tray 30 (S7), moreover, the same operation is repeated. Consequently, the ADF 3 sequentially feeds the documents G1, G2, G3, . . . mounted on the sheet feed tray 30 to the document delivery path 32 and the image reading unit 22 reads the images of the documents G1, G2, G3, . . . and sequentially discharges the read documents G1, G2, G3, . . . to the sheet discharge tray 31.

The double side reading mode will be described below.

When the "start" key of the operation panel 5 is pressed down, the document G1 is fed from the sheet feed tray 30. The document G1 reaching the crossing position 40 from the sheet feed tray 30 side of the document delivery path 32 is guided to the guide flap 46 and the guide flap 47 and is delivered to the reading position side of the document delivery path 32. The same operation as that in the single side reading mode is carried out until the image of the first face of the document G1 is read by means of the image reading unit 22 in the reading position.

Figure 12:
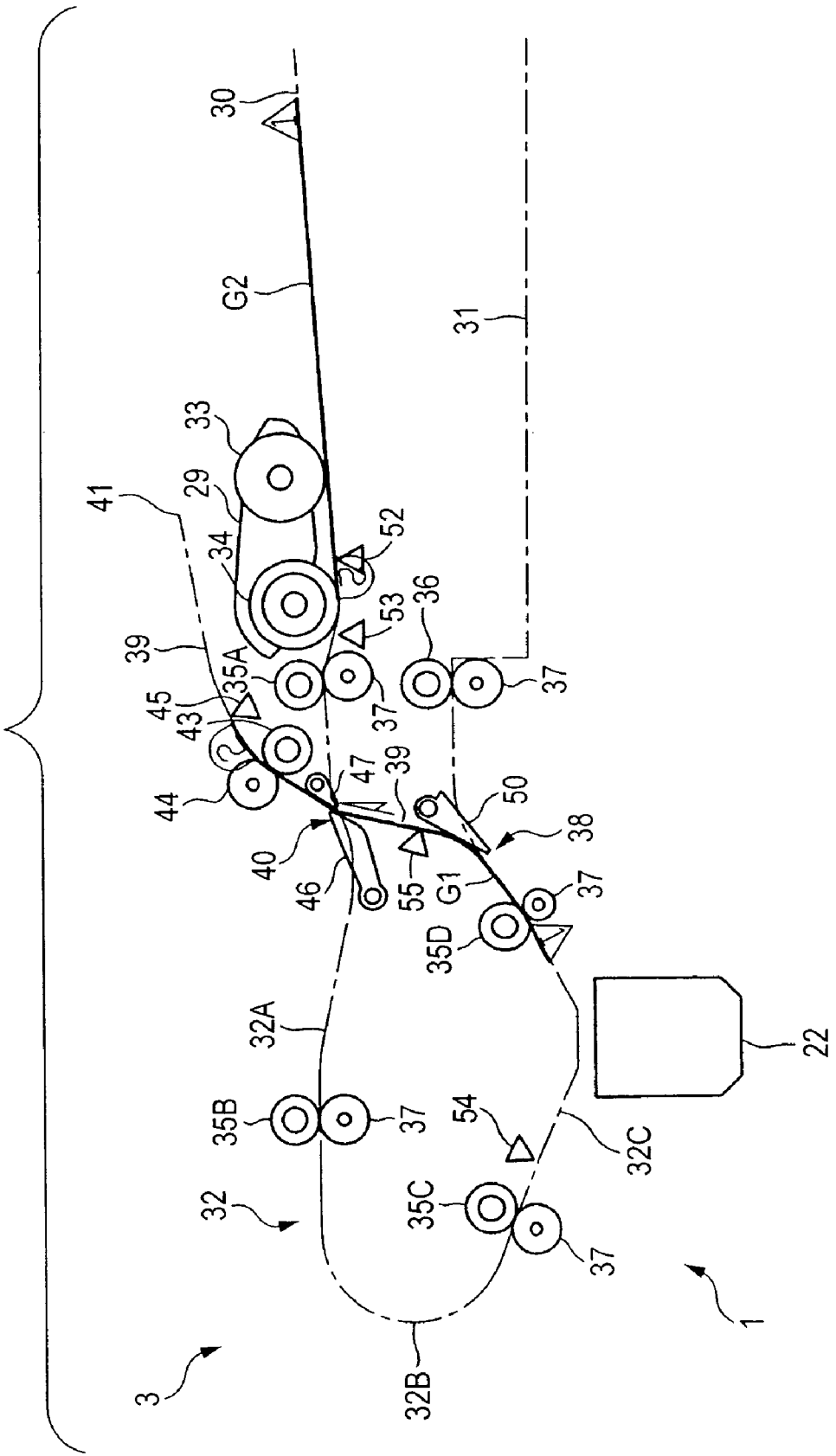
FIG. 12 is a schematic view showing an image reading operation in a double side reading mode.

The document G1 in which the image of the first face is completely read is guided to the switchback path 39 and is thus switchback delivered. Detailed description will be given. As shown in FIG. 12, the document G1 having the first face read is guided to the guide flap 50 and thus enters the switchback path 39 from the document delivery path 32 in the coupling position 38. The guide flap 50 is changed to take the second guide posture in an optional timing in which the document G1 reaches the coupling position 38. The switchback sensor 55 is turned ON when detecting the leading end in the delivery direction of the document G1 entering the switchback path 39. In the drawing, a face of the document Gn shown in "1" is a first face to be read earlier in the double side reading operation and a face shown in "2" is a second face to be read later. The first and second faces have a relationship of a surface and a back face.

The guide flap 46 closes the delivery path from the switchback path 39 to the crossing position 40. Therefore, the document G1 entering the switchback path 39 abuts on the guide flap 46 when reaching the crossing position 40. The guide flap 46 changes the posture from the third guide posture to the fourth guide posture so as to be pushed up by the document G1 delivered through the switchback path 39 as shown in FIG. 12. Consequently, the delivery path from the coupling position 38 side of the switchback path 39 to the terminal 41 side of the switchback path 39 is provided continuously, and furthermore, the delivery path to the reading position side of the document delivery path 32 is closed. Moreover, a delivery path to the sheet feed tray 30 side of the document delivery path 32 is closed by the guide flap 47. Accordingly, the document G1 reaching the crossing position 40 from the coupling position 38 side of the switchback path 39 is guided to the guide flap 46 and the guide flap 47 and is thus delivered to the terminal 41 side of the switchback path 39 without entering the document delivery path 32. Then, the document G1 is nipped by the switchback roller 43 and the pinch roller 44 and is delivered through the switchback path 39 toward the terminal 41 side by a rotation in a pull-in direction of the switchback roller 43.

Figure 13:
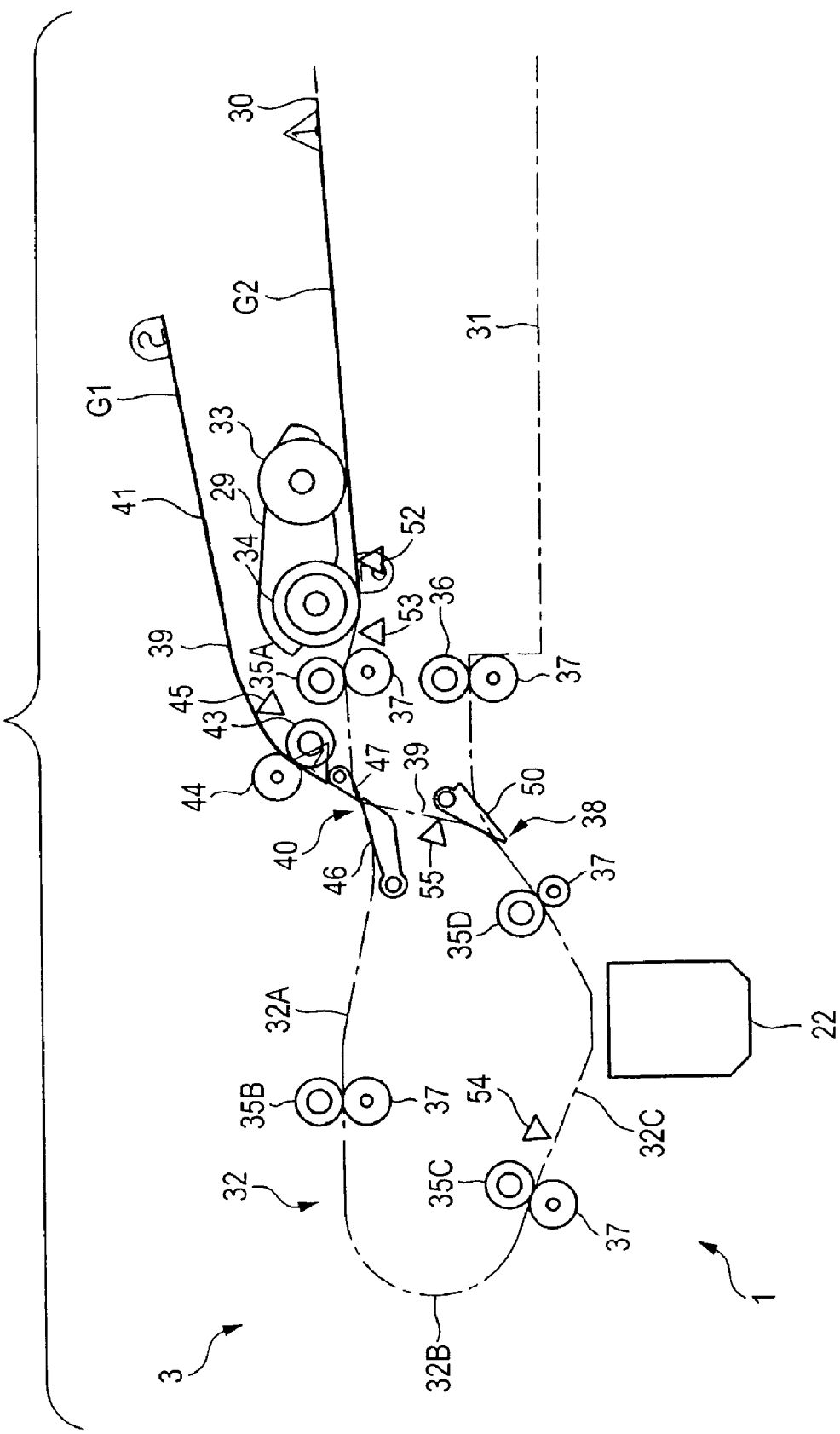
FIG. 13 is a schematic view showing the image reading operation in the double side reading mode.

As shown in FIG. 13, the trailing end in the delivery direction of the document G1 perfectly enters the terminal 41 side beyond the crossing position 40 of the switchback path 39 and the control portion 60 then switches a rotating direction of the motor 67. The switchback sensor 55 detects the trailing end in the delivery direction of the document G1 delivered through the switchback path 39 and is then turned OFF, and thereafter, the trailing end in the delivery direction of the document G1 is delivered through the crossing position 40 after a predetermined time passes. Accordingly, the control portion 60 determines that the trailing end in the delivery direction of the document G1 perfectly enters the terminal 41 side beyond the crossing position 40 of the switchback path 39 through a detection signal of the switchback sensor 55 and the count of a delivery distance or a delivery time by means of the delivery roller 35D and the switchback roller 43. The rotating direction of the motor 67 is switched so that the document G1 nipped between the switchback roller 43 and the pinch roller 44 and protruded from the terminal 41 is returned to the crossing position 40. More specifically, the document G1 is switchback delivered to be returned to the crossing position 40 through the switchback path 39.

When a part of the document G1 is protruded from the terminal 41 of the switchback path 39 to the outside of the ADF 3, a portion of the document G1 which is protruded is supported by the document support portion 42. When the document G1 passes through the crossing position 40 and goes away from the guide flap 46, moreover, the guide flap 46 is rotated downward and is thus recovered to take the third guide posture.

Figure 14:
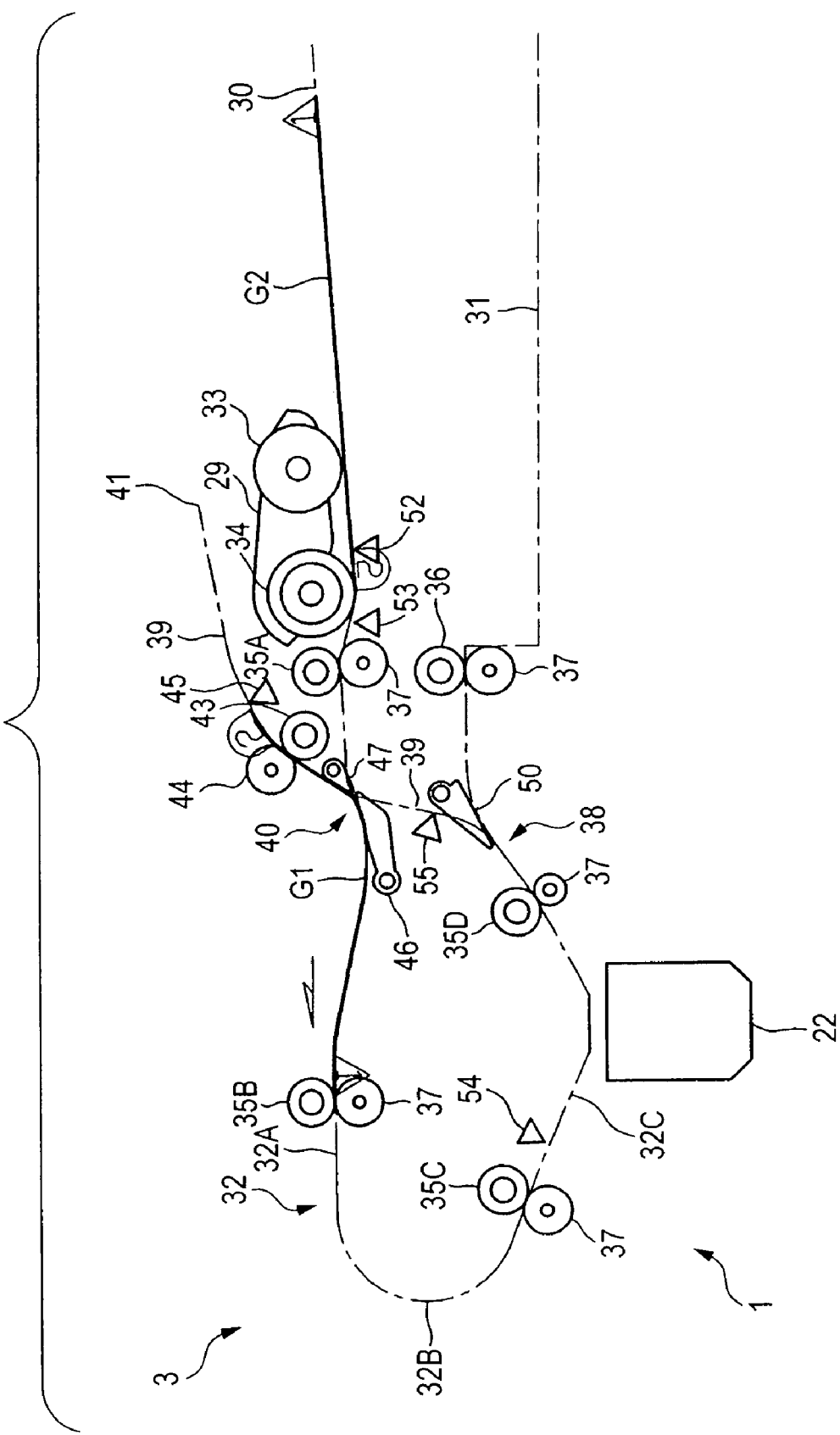
FIG. 14 is a schematic view showing the image reading operation in the double side reading mode.

As shown in FIG. 14, the document G1 returned from the switchback path 39 abuts on the guide flap 46 taking the third guide posture in the crossing position 40. The guide flap 46 is not rotated downward in the third guide posture. Accordingly, the delivery path from the terminal 41 side of the switchback path 39 to the reading position side of the document delivery path 32 is provided continuously, and furthermore, the delivery path to the coupling position 38 side of the switchback path 39 is closed. Moreover, the guide flap 47 closes the delivery path to the sheet feed tray 30 side of the document delivery path 32. Therefore, the document G1 is guided to the guide flap 46 and the guide flap 47 and does not enter the coupling position 38 side of the switchback path 39 and the sheet feed tray 30 side of the document delivery path 32 but is delivered from the terminal 41 side of the switchback path 39 to the reading position side of the document delivery path 32. The document G1 is returned from the switchback path 39 to the upstream side of the reading position of the document delivery path 32 so that the document G1 is first delivered through the document delivery path 32, and is then retransmitted through the document delivery path 32 in a state in which the leading and the trailing end are inverted. Thus, the document G1 is switchback delivered.

Figure 15:
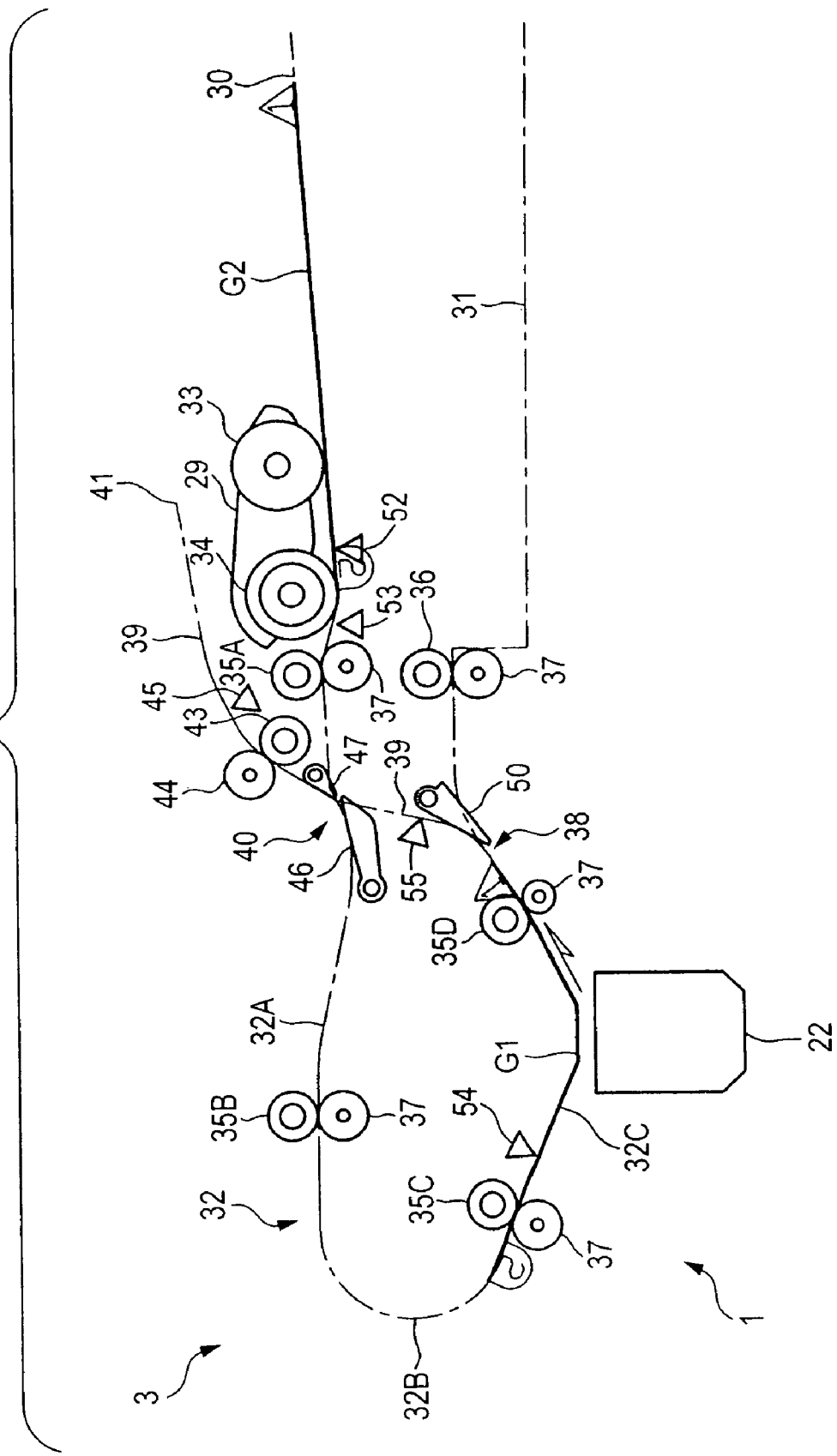
FIG. 15 is a schematic view showing the image reading operation in the double side reading mode.

When the leading end in the delivery direction of the document G1 is detected by the rear sensor 54 and the leading end in the delivery direction reaches the reading position, the control portion 60 causes the image reading unit 22 to read the image of the second face of the document G1 as shown in FIG. 15. The document G1 passes through the reading position with the second face opposed to the image reading unit 22 and the image of the second face of the document G1 is read by the image reading unit 22.

The rear sensor 54 is turned OFF when detecting the trailing end in the delivery direction of the document G1. The control portion 60 ends to read the image of the second face of the document G1 by the image reading unit 22 after a predetermined time passes since the rear sensor 54 is turned OFF.

The document G1 having the second face read is guided to the guide flap 50 in order to align directions of pages and then enters the switchback path 39 from the document delivery path 32 in the coupling position 38 again. The switchback sensor 55 is turned ON when detecting the leading end in the delivery direction of the document G1 entering the switchback path 39.

The document G1 entering the switchback path 39 and reaching the crossing position 40 pushes the guide flap 46 upward and changes the posture from the third guide posture to the fourth guide posture, thereby entering the terminal 41 side of the switchback path 39 in the crossing position 40 in the same manner as in FIG. 12. In the same manner as in FIG. 13, then, the trailing end in the delivery direction of the document G1 completely enters the terminal 41 side beyond the crossing position 40 of the switchback path 39 and the control portion 60 then switches the rotating direction of the motor 67, and rotates the switchback roller 43 in a returning direction to return the document G1 to the crossing position 40. In the same manner as in FIG. 14, thereafter, the document G1 returned from the switchback path 39 is guided to the guide flap 46 and the guide flap 47 and is thus delivered from the terminal 41 side of the switchback path 39 to the reading position side of the document delivery path 32. Consequently, the document G1 is retransmitted through the document delivery path 32 in a state in which the leading and the trailing end are inverted again, that is, a state in which the document G1 is fed to the document delivery path 32 for the first time.

Then, the document G1 passes through the reading position with the first face opposed thereto. In that case, the rear sensor 54 is turned ON when detecting the document G1. The delivery serves to discharge a sheet to the sheet discharge tray 31 in a state in which the order of a plurality of documents Gn mounted on the sheet feed tray 30 is maintained. Therefore, the control portion 60 does not read the image of the document G1.

The document G1 reaching the coupling position 38 is guided to the sheet discharge tray 31 side in the coupling position 38 by means of the guide flap 50 and is discharged to the sheet discharge tray 31 with the first face placed in a lower part by means of the sheet discharge roller 36. The guide flap 50 is changed to take a first guide posture in an optional timing before the document G1 reaches the coupling position 38. Consequently, the document G1 is discharged to the sheet discharge tray 31 with the first face placed in the lower part.

When the both sides of the document G1 are ended to be read, the control portion 60 determines whether the document G2 to be read next is set into the sheet feed tray 30 or not (S7). In the case in which the next document G2 is set into the sheet feed tray 30, the first front sensor 52 is turned ON. If it is determined that the document G2 is present, the control portion 60 transmits the driving operation from the motor 67 to the sheet feed roller 33 and the separating roller 34 to be rotated. Consequently, the document G2 mounted on the sheet feed tray 30 is fed to the document delivery path 32 so that the same double side reading operation as in the document G1 is carried out.

In the aspect, the double side reading operation of the image reading apparatus 1 has been described on the assumption that the documents Gn mounted on the sheet feed tray 30 are discharged to the sheet discharge tray 31 in a state in which the order of the documents Gn is maintained. In the case in which it is not necessary to match the order of the documents Gn mounted on the sheet feed tray 30 with that of the documents Gn discharged to the sheet discharge tray 31, it is also possible to deliver the document Gn in the coupling position 38 to the sheet discharge tray 31 side and to discharge the document Gn to the sheet discharge tray 31 without causing the document Gn to enter the switchback path 39 again after delivering the document Gn with the second face opposed to the reading position. Consequently, the order of the documents Gn is not maintained in the sheet discharge tray 31. However, it is possible to omit a last switchback delivery. Therefore, it is possible to shorten a time required for reading both sides of the document Gn. By repeating the discharge of the document G1 and the feed of the document G2, moreover, it is also possible to shorten a time required for the delivery in the case in which both sides of each of the documents Gn are read continuously.

During the image reading operation in the single side reading mode or the double side reading mode, when the "interruption" key of the operation panel 5 is pressed down (S6: Yes), the control portion 60 completes to read the image of the document Gn delivered to the document delivery path 32 and is then stopped. In other words, when an image of a document Gk fed to the document delivery path 32 is completely read and the document Gk is then discharged, the image reading operation is stopped without feeding a next document Gk+1 to the document delivery path 32 so that the image reading operation is temporarily stopped. The control portion 60 stores, in the RAM 63, the reading conditions of the stopped image reading operation and the image data on the document Gn which has already been read (S8). The reading conditions include a document size, a document density, a reading resolution and a reading mode (a single side or both sides), and may include the number of copies, a recording sheet size, and an enlargement or reduction magnification if the image reading operation is carried out for copying. The reading conditions may be stored in the RAM 63 when they are set before the image reading operation. While the image data on the document Gn are stored in a predetermined region of the RAM 63 in the image reading operation of the document Gn, moreover, the image data stored in the predetermined region may be stored in another region and the same predetermined region may be used for the image reading operation which is interrupted.

Consequently, the image reading apparatus 1 is brought into the interruption state so that the interruption image reading (second image reading) operation can be carried out.

Figure 16:
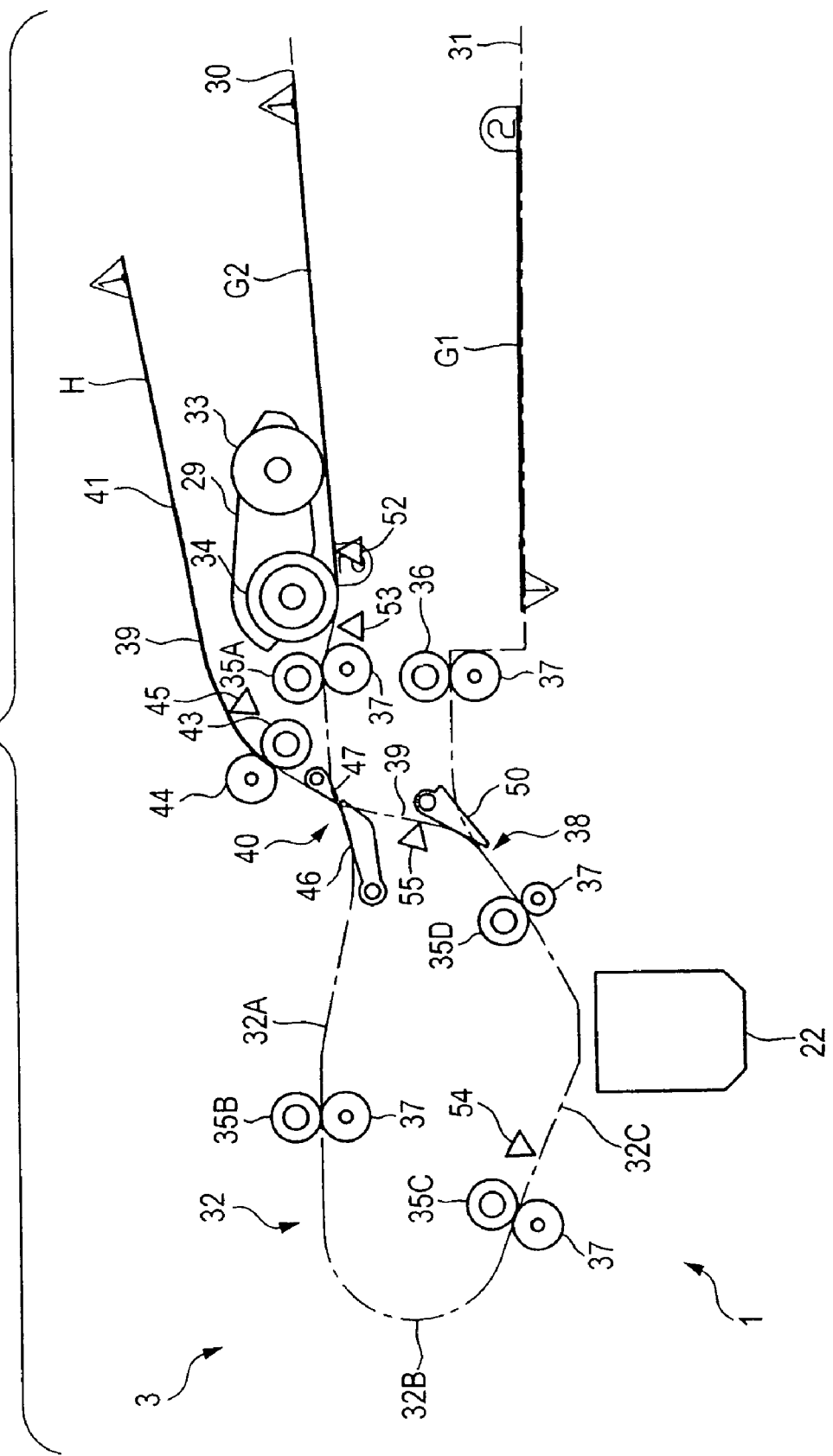
FIG. 16 is a schematic view showing an interruption image reading operation.

Although the current image reading (first image reading) operation is stopped, the document Gn which has not been read is maintained to be mounted on the sheet feed tray 30 and the read document Gn is maintained to be held on the sheet discharge tray 31. As shown in FIG. 16, in the interruption image reading operation, a document H to be read is inserted in the terminal 41 of the switchback path 39. A leading end in a delivery direction of the document H abuts on a nip position of the switchback roller 43 and the pinch roller 44 so that a document setting state is brought. As described above, the terminal 41 of the switchback path 39 is opened on the upper cover 6 of the ADF 3. Therefore, the document H can be inserted easily. The document H is inserted in the switchback path 39 in so-called face-up in such a manner that the reading face (the first face) is placed on an upper side. FIG. 16 shows the case in which the "interruption" key is pressed down during the image reading operation of the document G1 and the single side reading operation for one document H is carried out. Accordingly, the document G1 from which the image is completely read is held in the sheet discharge tray 31 and the document G2 and succeeding documents from which the images have not been read are mounted on the sheet feed tray 30. The reading mode and the document size in the interruption image reading operation are input in an arbitrary timing until the "start" key is pressed down after the image reading apparatus 1 is brought into the interruption state.

When the "start" key of the operation panel 5 is pressed down (S9), the control portion 60 determines whether the document H is set onto the terminal 41 of the switchback path 39 or not (S10). If the document H is set onto the terminal 41 of the switchback path 39, the interruption document sensor 45 is turned ON. If the document H is not set, the interruption document sensor 45 is turned OFF. If the document H is not inserted in the switchback path 39, the control portion 60 causes the liquid crystal display portion 12 to display an error indicating that the document is not set.

The control portion 60 feeds the sheet if the document H is set into the switchback path 39 (S12). In detail, the control portion 60 drives the motor 67 and rotates and drives the delivery rollers 35A, 35B, 35C and 35D, the sheet discharge roller 36 and the switchback roller 43 in a predetermined timing. The documents Gn from which the image has not been read are maintained to be mounted on the sheet feed tray 30. Therefore, the sheet feed roller 33 and the separating roller 34 are neither rotated nor driven. When the switchback roller 43 is rotated and driven in a returning direction, the document H is nipped between the switchback roller 43 and the pinch roller 44 and is thus fed from the terminal 41 of the switchback path 39 into the crossing position 40.

Figure 17:
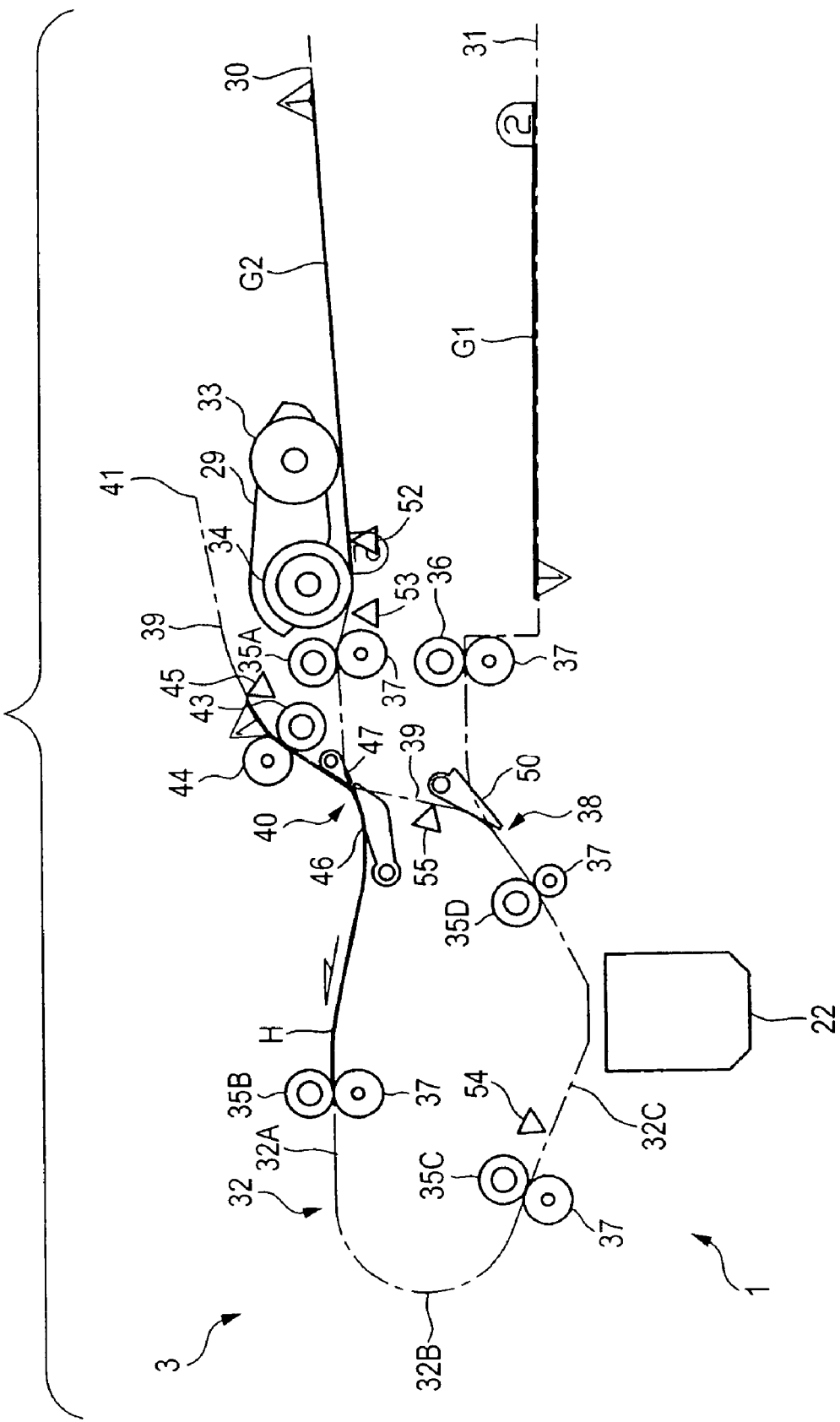
FIG. 17 is a schematic view showing the interruption image reading operation.

As shown in FIG. 17, the document H reaching the crossing position 40 abuts on the guide flap 46 taking the third guide posture. The guide flap 46 is not rotated downward from the third guide posture. Accordingly, the delivery path from the terminal 41 side of the switchback path 39 to the reading position side of the document delivery path 32 is provided continuously, and furthermore, the delivery path to the coupling position 38 side of the switchback path 39 is closed. Moreover, the guide flap 47 closes the delivery path to the sheet feed tray 30 side of the document delivery path 32. Accordingly, the document H is guided to the guide flap 46 and the guide flap 47 and is thus delivered from the terminal 41 side of the switchback path 39 to the reading position side of the document delivery path 32 without entering the coupling position 38 side of the switchback path 39 and the sheet feed tray 30 side of the document delivery path 32.

Figure 18:
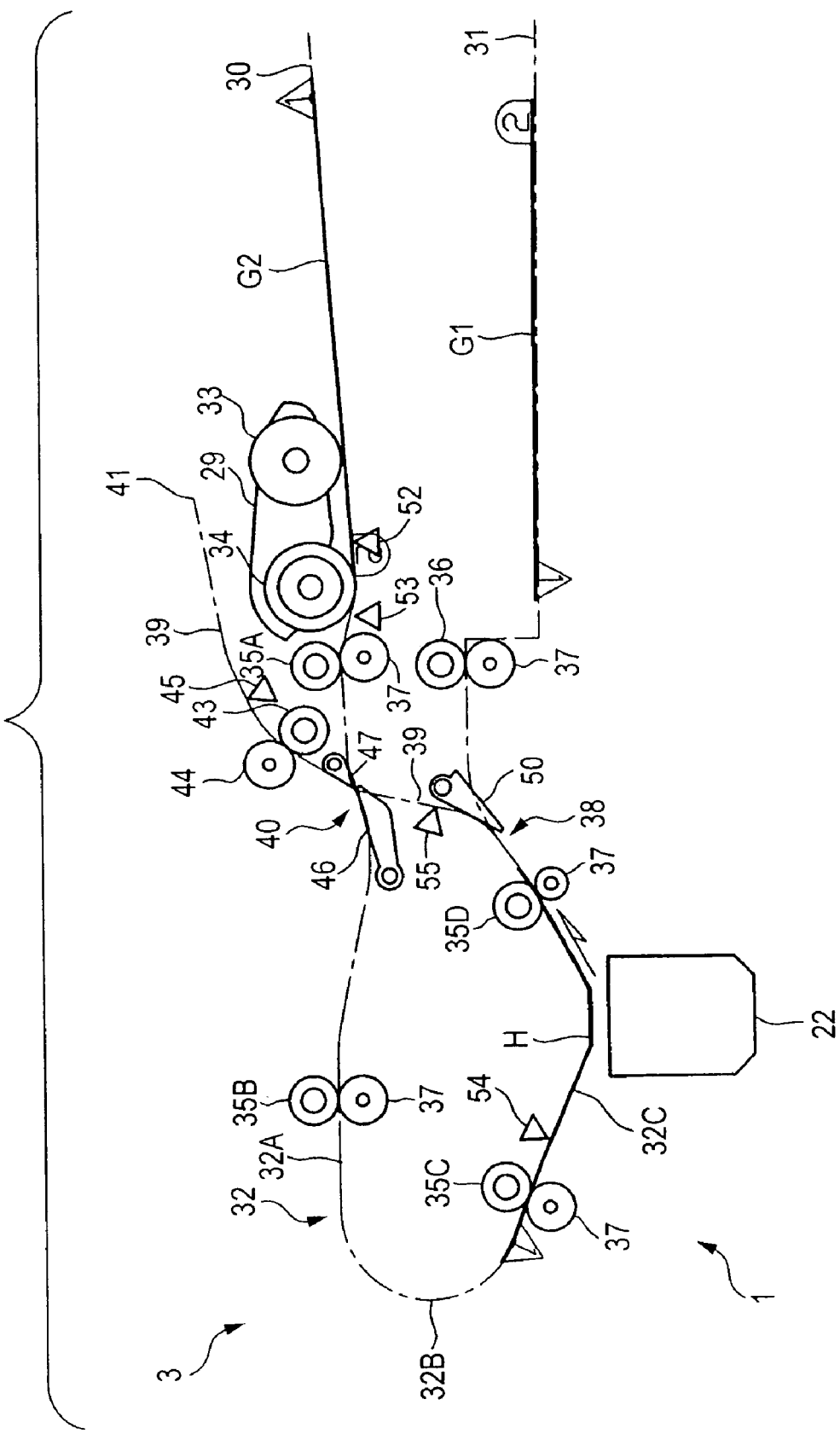
FIG. 18 is a schematic view showing the interruption image reading operation.

As shown in FIG. 18, the document H is delivered to be inverted downward by the curved portion 32B of the document delivery path 32 and the rear sensor 54 detects the leading end in the delivery direction of the document H and is thus turned ON. If the leading end in the delivery direction of the document H reaches the reading position, the control portion 60 operates the image reading unit 22, thereby reading the image of the document H (S13: second image reading operation). The document H passes through the reading position with the first face opposed to the image reading unit 22 so that an image of the first face of the document H is read by the image reading unit 22. The rear sensor 54 is turned OFF when detecting the trailing end in the delivery direction of the document H. The control portion 60 ends to read the image of the document H by the image reading unit 22 after a predetermined time passes since the rear sensor 54 is turned OFF.

Figure 19:
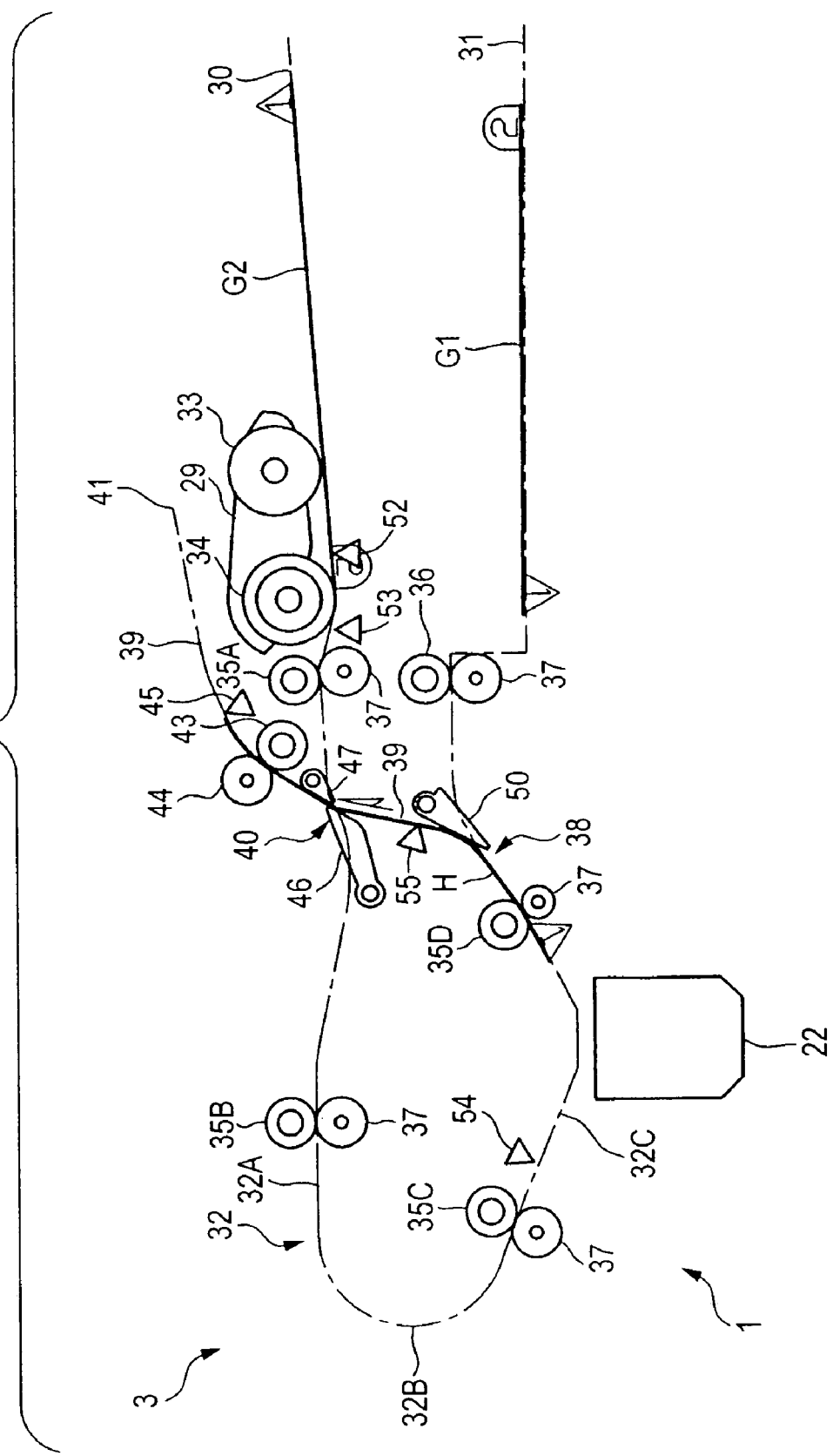
FIG. 19 is a schematic view showing the interruption image reading operation.

The document H in which the image of the first face is completely read is guided to the switchback path 39 and is discharged from the terminal 41 (S14). Specifically, as shown in FIG. 19, the document H having the first face read is guided to the guide flap 50 and thus enters the switchback path 39 from the document delivery path 32 in the coupling position 38. The guide flap 50 is changed to take the second guide posture in an arbitrary timing in which the document G1 reaches the coupling position 38.

The document H reaching the crossing position 40 from the coupling position 38 side of the switchback path 39 is guided to the guide flap 46 and the guide flap 47 and is thus delivered to the terminal 41 side of the switchback path 39 without entering the document delivery path 32. Then, the document H is nipped between the switchback roller 43 and the pinch roller 44 and is discharged to the terminal 41 of the switchback path 39. Thus, the single side reading operation for the interrupting document H is ended. The read document H is discharged from the terminal 41 of the switchback path 39 so that it is not mixed with the document G1 from which the image has been read and which has been discharged to the sheet discharge tray 31. In particular, the invention is suitable for the case in which one document H carries out the interruption as in the aspect.

Even if the image reading operation for the document H is completed, the control portion 60 maintains the interruption state until the "interruption" key of the operation panel 5 is pressed down again. In the case in which another document is to carry out the interruption, accordingly, the "interruption" key is not pressed down (S15: No) but the document is inserted from the terminal 41 of the switchback path 39 and the "start" key is pressed down (S16: Yes) in the same manner as described above. Consequently, the same image reading operation as that for the document H is carried out. While it is assumed that the interrupting document H is subjected to the single side reading operation in the aspect, it is apparent that both sides of the document H can also be read.

After the image reading operation for the document H, the "interruption" key of the operation panel 5 is pressed down (S15: Yes) so that the control portion 60 releases the interruption state. The reading conditions and the image data which are stored in the RAM 63 are read (S17). Consequently, the image reading operation for the document Gn can be restarted. When the interruption is released, the reading conditions executed previously are read from the RAM 63. When restarting the image reading operation for the document Gn, therefore, it is not necessary to input the reading conditions to the operation panel 5 again.

Moreover, the sheet feed tray 30 has no document Gn from which the image has been read and only the documents Gn from which the images have not been read are left. In other words, as shown in FIG. 16, the document G1 is present in the sheet discharge tray 31 and the document G2 and the succeeding documents are left in the sheet feed tray 30. The control portion 60 releases the interruption state and then reads the image data on the document G1 stored in the RAM 63. Therefore, it is not necessary to carry out the image reading operation for the document G1 again. Consequently, it is possible to shorten a time required for reading the image from the document Gn after the restart.

When the "start" key of the operation panel 5 is pressed down (S18: Yes), the control portion 60 determines whether the document H is left in the terminal 41 of the switchback path 39 or not (S20). If the document H is left in the terminal 41 of the switchback path 39, the interruption document sensor 45 is turned ON. If the document H is not left, the interruption document sensor 45 is turned OFF. If the document H is left in the switchback path 39, the control portion 60 causes the liquid crystal display portion 12 to display an error indicating that the interrupting document is to be removed from the switchback path 39 (S21).

If the document H is not left in the terminal 41 of the switchback path 39, the control portion 60 determines whether the document Gn is set into the sheet feed tray 30 (S7) or not as described above, and the sheet feed (S3), the image reading (S4) and the sheet discharge (S5) are repeated corresponding to the number of the document G2 and the succeeding documents from which the images have not been read. Thus, the image of the document Gn is read.

In the case in which the "start" key of the operation panel is not pressed down for a predetermined period of time after the release of the interruption, moreover, a time-out is set (S19: Yes) and the control portion 60 determines whether the document H is left in the terminal 41 of the switchback path 39 or not (S20). If the document H is present (S20: Yes), then, the image reading operation for the document Gn is automatically restarted. Consequently, in the case in which a person executing the image reading operation for the document Gn is different from a person executing the image reading operation for the document H through the interruption, for example, it is not necessary to stand by on the image reading apparatus 1 side until the former ends the latter interruption image reading operation. Even if the latter does not press down the "start" key to restart the former image reading operation, the image reading operation for the document Gn is restarted.

Thus, the document H for the interruption image reading operation (second image reading operation) to be carried out by temporarily stopping the image reading operation (first image reading operation) for the document Gn is inserted from the terminal 41 of the switchback path 39. When the interruption image reading operation for the document H is to be carried out, consequently, it is not necessary to remove the document Gn left in the sheet feed tray 30 without carrying out the image reading operation. Thus, it is possible to simplify a procedure for the interruption image reading operation and a procedure for restarting the previous image reading operation. Therefore, it is possible to enhance a utility of the image reading apparatus 1.

While it is assumed that the read document H is discharged to the terminal 41 of the switchback path 39 in the interruption image reading operation in the aspect, the control portion 60 may control the driving operation in order to discharge the document H to the sheet discharge tray 31. In other words, as shown in FIG. 18, the guide flap 50 is set to take the first guide posture and the document H is guided to the sheet discharge tray 31 side of the document delivery path 32 in the coupling position 38 and is discharged from the sheet delivery path 32 to the sheet discharge tray 31 by means of the sheet discharge roller 36 and the pinch roller 37 after the image is read from the document H. In the case in which a plurality of documents H is present, consequently, the sheet feed (S12) and the image reading (S13) can be continuously carried out to sequentially discharge them to the sheet discharge tray 31 when the next document H is set onto the terminal 41 of the switchback path 31. Therefore, the invention is suitable for the case in which the interruption image reading operation is to be carried out over a plurality of sheets.

In the aspect, moreover, the control portion 60 may discharge the document H discharged to the terminal 41 of the switchback path 39 to the sheet discharge tray 31 after a predetermined time passes since the end of the interruption document reading operation. If the document H is left in the terminal 41 of the switchback path 39 after the image reading operation for the document H is completed, the document Gn comes in contact with the document H in the switchback path 39 when the image reading operation for the document Gn is restarted to carry out the double side reading operation. Thus, a sheet jam may be caused. In the aspect, accordingly, when the start key for restarting the image reading operation for the document Gn is pressed down (S18: Yes) or a time-out is set (S19: Yes), the control portion 60 determines whether the document H is left in the terminal 41 of the switchback path 39 or not (S20). If the document H is left, the error display is carried out (S21).

The control portion 60 discharges the document H discharged to the terminal 41 of the switchback path 39 to the sheet discharge tray 31 after a predetermined time passes. Even if a person executing the interruption image reading operation does not remove the document H subjected to the reading operation, consequently, it is possible to restart the image reading operation for the document Gn. In particular, the invention is suitable for the case in which the image reading operation for the document Gn is automatically restarted because of the time-out (S19).

More specifically, when the document H subjected to the image reading operation is to be discharged to the terminal 41 of the switchback path 39, the control portion 60 stops the rotating and driving operations of the switchback roller 43 and the pinch roller 44 in a state in which they nip the document H therebetween. Consequently, the document H is protruded from the terminal 41 to the outside of the ADF 3 in a state in which it is nipped between the switchback roller 43 and the pinch roller 44. In the case in which the document H is removed, it is pulled out of the switchback path 39. Thus, the switchback roller 43 and the pinch roller 44 are rotated together so that the nip is released.

When the interruption document sensor 45 is ON even if a predetermined time passes after the end of the interruption image reading operation, the control portion 60 rotates and drives the switchback roller 43 in a returning direction, thereby feeding the document H from the crossing position 40 into the document delivery path 32 as shown in FIG. 17. Then, the document H reaching the coupling position 38 is guided to the sheet discharge tray 31 side in the coupling position 38 through the guide flap 50 and is thus discharged to the sheet discharge tray 31. The guide flap 50 is changed to take the first guide posture in an optional timing in which the document H reaches the coupling position 38. Consequently, the document H is automatically removed from the terminal 41 of the switchback path 39. Even if the double side reading operation for the document Gn is restarted, therefore, the documents H and Gn can be prevented from coming in contact with each other in the document delivery path 32 and the switchback path 39.

What is claimed is:

1. An image reading apparatus comprising:
   a document delivering unit that delivers a first document over which an image reading operation is to be carried out along a document delivery path linked to a document discharging portion via a reading position from a document mounting portion;
   a switchback delivering unit that pulls the document into a switchback delivery path extended to an opening formed on an external surface of an apparatus housing from a predetermined position of the document delivery path, thereby returning the document from a downstream side of the image reading position to an upstream side of the image reading position with a leading and a trailing end in the document inverted;
   an image reading unit that reads an image of the document delivered to the reading position of the document delivery path; and
   a control unit that delivers a second document which is different from the first document inserted from the external surface of the apparatus housing into the opening of the switchback delivery path to the reading position by the switchback delivering unit and the document delivering unit, thereby reading an image in a second image reading operation based on the second document to be carried out by temporarily stopping a first image reading operation based on the first document.

2. The image reading apparatus according to claim 1, further comprising:
   a stoppage request unit that gives a request for stopping the first image reading operation;
   a second image reading start request unit that gives a request for starting the second image reading operation during the stoppage of the first image reading operation; and
   a first image reading restart request unit that gives a request for restarting the first image reading operation which is stopped,
   the control unit storing, in a storage unit, image data obtained by reading an image and a reading condition for the first image reading operation when the request for stopping the first image reading operation is given by the stoppage request unit, delivering the document inserted in the opening of the switchback delivery path to the document delivery path, thereby reading an image when the request for starting the second image reading operation is given by the second image reading start request unit, and restarting the first image reading operation based on the image data and the reading condition which are stored in the storage unit when the request for restarting the first image reading operation is given by the restart request unit.

3. The image reading apparatus according to claim 1, wherein the control unit discharges the document subjected to the second image reading operation to the opening of the switchback delivery path.

4. The image reading apparatus according to claim 1, wherein the control unit discharges the document subjected to the second image reading operation to the document discharging portion.

5. The image reading apparatus according to claim 3, wherein the control unit discharges the document discharged to the opening of the switchback delivery path to the document discharging portion after a predetermined time passes.

6. The image reading apparatus according to claim 1, wherein the control unit restarts the first image reading operation stopped temporarily after the predetermined time passes since execution of the second image reading operation.

7. The image reading apparatus according to claim 1, wherein the document mounting portion and the document discharging portion are disposed in upper and lower stages and the switchback delivery path is extended toward an upper side of the document mounting portion and the document discharging portion.

* * * * *